United States Patent
Ren et al.

(10) Patent No.: US 12,192,110 B2
(45) Date of Patent: Jan. 7, 2025

(54) PACKET TRANSMISSION METHOD, APPARATUS, DEVICE, AND READABLE STORAGE MEDIUM

(71) Applicant: HUAWEI TECHNOLOGIES CO., LTD., Guangdong (CN)

(72) Inventors: Shoushou Ren, Beijing (CN); Bingyang Liu, Shenzhen (CN); Rui Meng, Beijing (CN); Chuang Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 124 days.

(21) Appl. No.: 18/161,247

(22) Filed: Jan. 30, 2023

(65) Prior Publication Data

US 2023/0171197 A1    Jun. 1, 2023

Related U.S. Application Data

(63) Continuation of application No. PCT/CN2021/104057, filed on Jul. 1, 2021.

(30) Foreign Application Priority Data

Jul. 31, 2020    (CN) ......................... 202010761634.4

(51) Int. Cl.
     *H04L 47/28*      (2022.01)
     *H04L 47/10*      (2022.01)
     *H04L 47/17*      (2022.01)

(52) U.S. Cl.
     CPC .............. *H04L 47/28* (2013.01); *H04L 47/15* (2013.01); *H04L 47/17* (2013.01)

(58) Field of Classification Search
None
See application file for complete search history.

(56) References Cited

U.S. PATENT DOCUMENTS 10,277,518 B1    4/2019    Matthews et al.
10,735,339 B1 *   8/2020    Matthews ............ H04L 47/562
(Continued)

FOREIGN PATENT DOCUMENTS

CN    107431667 A    12/2017
CN    108449228 A    8/2018
(Continued)

OTHER PUBLICATIONS

Wikipedia, Weighted fair queueing, https://en.wikipedia.org/wiki/Weighted_fair_queueing, date unknown, 3 pages.
(Continued)

*Primary Examiner* — June Sison
(74) *Attorney, Agent, or Firm* — WOMBLE BOND DICKINSON (US) LLP

(57) ABSTRACT

This application discloses a packet transmission method, an apparatus, a device, and a readable storage medium, and relates to the field of communication technologies. The method applied to a second network device includes: First, a first packet sent by a first network device is received, and then a second packet, a first dwell time period, and a second dwell time period are obtained based on the first packet. Then, a time difference between the second dwell time period and the first dwell time period is determined. Then, a third dwell time period and a fourth dwell time period are determined, to encapsulate the third dwell time period, the fourth dwell time period, and the second packet to obtain a third packet.

20 Claims, 10 Drawing Sheets

(56) References Cited

U.S. PATENT DOCUMENTS

2010/0284274 A1    11/2010  Ghanadan et al.
2014/0036695 A1*    2/2014  Ziegler ................ H04L 49/901
                                                        370/252
2019/0199642 A1*    6/2019  Jiang ...................... H04L 45/50

FOREIGN PATENT DOCUMENTS

CN       110086728 A    8/2019
CN       110166380 A    8/2019

OTHER PUBLICATIONS

Tony Jeffree, P802.1Qch Cyclic Queuing and Forwarding, https://1.ieee802.org/tsn/802-1qch/, Feb. 16, 2015, 5 pages.
Ren Shoushou et al., A Damper Scheduling Mechanism Based on Network Calculus Theory, Journal of Beijing University of Posts and Telecommunications, Jan. 1, 2015, with an English abstract total 6 pages.

* cited by examiner

CONT. FROM FIG. 8A

CONT. FROM FIG. 8A

CONT. FROM FIG. 8A

806: Determine a time difference between the second dwell time period of the target packet flow on the first network device and the first dwell time period of the second packet on the first network device, where the time difference is an active delay time period of the second packet on the second network device 807: Obtain a third dwell time period of the second packet on the second network device, and obtain a fourth dwell time period of the target packet flow on the second network device 808: Encapsulate the second packet, the third dwell time period of the second packet on the second network device, and a downstream dwell time period of the target packet flow on one or more downstream network devices of the first network device, to obtain a third packet 809: Send the third packet to the next-hop network device of the second network device on the core network transmission path of the target packet flow after the first packet received by the second network device reaches the active delay time period and is queued in a queuing system of the second network device

FIG. 8B

PACKET TRANSMISSION METHOD, APPARATUS, DEVICE, AND READABLE STORAGE MEDIUM

CROSS-REFERENCE TO RELATED APPLICATIONS

This application is a continuation of International Application No. PCT/CN2021/104057, filed on Jul. 1, 2021, which claims priority to Chinese Patent Application No. 202010761634.4, filed on Jul. 31, 2020. The disclosures of the aforementioned applications are hereby incorporated by reference in their entireties.

TECHNICAL FIELD

This application relates to the field of communication technologies, and in particular, to a packet transmission method, an apparatus, a device, and a readable storage medium.

BACKGROUND

With development of communication technologies, a quantity of packets transmitted by using an internet protocol (IP) network also increases. A network device in an IP network performs line-rate processing on a packet. Therefore, if the network device simultaneously receives a plurality of different packet flows, packets in the different packet flows squeeze each other, and a packet gap is reduced. Consequently, a burst is continuously accumulated, and a delay and a jitter of a packet increase and become unpredictable in a transmission process. Therefore, a packet transmission method that can eliminate burst accumulation needs to be provided, to ensure deterministic delay and jitter of a packet.

In a related technology, a packet is transmitted by using a cyclic queuing and forwarding (CQF) method. According to this method, clock edges of all network devices in an IP network are first aligned, to ensure that different network devices are in a same period at a same moment. Then, for a neighboring network device in the IP network, a packet sent by a $1^{st}$ network device in a $1^{st}$ period is received by a $2^{nd}$ network device in the $1^{st}$ period. The $2^{nd}$ network device forwards the received packet to a $3^{rd}$ network device in a $2^{nd}$ period, and the $3^{rd}$ network device completes receiving of the packet in the $2^{nd}$ period. By analogy, packet transmission can be implemented. If a length of a path between network devices is N, in other words, (N+1) network devices are included between two ends and period duration is T, a maximum total delay of a packet between the two ends in a transmission process is (N+1)T, a minimum total delay is (N−1)T, and a jitter is 2 T, so that a deterministic delay of the packet is ensured in the transmission process.

However, in the related technology, clock synchronization needs to be performed on all the network devices in the IP network. Therefore, implementation of the method is complex. In addition, due to a limitation of the period duration, a distance between a pair of adjacent network devices cannot be excessively long. Therefore, the method is only applicable to a small-scale IP network, and is limited. It can be learned that the method provided in the related technology is not practical enough, and transmission effect is poor.

SUMMARY

This application provides a packet transmission method, an apparatus, a device, and a readable storage medium, to improve packet transmission effect. Technical solutions are as follows:

According to a first aspect, a packet transmission method is provided.

A second network device first receives a first packet sent by a first network device, and then obtains a second packet in a target packet flow, a first dwell time period of the second packet on the first network device, and a second dwell time period of the target packet flow on the first network device based on the first packet. The first dwell time period is a time difference between a first moment and a second moment, the first moment is a moment at which the second packet enters a queuing system of the first network device, the second moment is a moment at which the second packet is sent by the first network device after being queued in the queuing system of the first network device, and the second dwell time period is an upper threshold for a period of dwelling of the target packet flow on the first network device. Then, the second network device determines a time difference between the second dwell time period of the target packet flow on the first network device and the first dwell time period of the second packet on the first network device, where the time difference is an active delay time period of the second packet on the second network device.

Next, the second network device obtains a third dwell time period of the second packet on the second network device, and obtains a fourth dwell time period of the target packet flow on the second network device, to encapsulate the third dwell time period of the second packet on the second network device, the fourth dwell time period of the target packet flow on the second network device, and the second packet, to obtain the third packet. The third dwell time period is a time difference between a third moment and a fourth moment, the third moment is a moment at which the second network device ends an active delay of the second packet, the fourth moment is a moment at which the second packet is sent by the second network device after being queued in a queuing system of the second network device, and the fourth dwell time period is an upper threshold for a period of dwelling of the target packet flow on the second network device. The second network device sends the third packet to a next-hop network device of the second network device on a core network transmission path of the target packet flow after the first packet received by the second network device reaches the active delay time period and is queued in the queuing system of the second network device.

Each network device actively delays a to-be-transmitted packet, to ensure that to-be-transmitted packet has a deterministic delay between a pair of adjacent network devices, and further ensure that the to-be-transmitted packet has a deterministic delay between two ends. In addition, a time period in which each network device performs active delay is obtained based on a packet flow in which the to-be-transmitted packet is located. This avoids mutual interference between different packet flows. This method is not only simple to implement, but also applicable to IP networks of various scales. It can be learned that the method is practical and has good transmission effect.

In an embodiment, the core network transmission path of the target packet flow includes one or more upstream network devices of the first network device and one or more downstream network devices of the first network device. The first packet further includes one or more upstream dwell time periods of the target packet flow on the one or more upstream network devices, the one or more upstream dwell time periods are in a one-to-one correspondence with the one or more upstream network devices, and any upstream dwell time period is an upper threshold for a period of dwelling of the target packet flow on an upstream network device. The first packet further includes one or more downstream dwell time periods of the target packet flow on the one or more downstream network devices, the one or more downstream dwell time periods are in a one-to-one correspondence with the one or more downstream network devices, and any downstream dwell time period is an upper threshold for a period of dwelling of the target packet flow on a downstream network device.

The encapsulating the third dwell time period of the second packet on the second network device, the fourth dwell time period of the target packet flow on the second network device, and the second packet, to obtain the third packet includes: encapsulating the second packet, the third dwell time period of the second packet on the second network device, and the downstream dwell time periods of the target packet flow on the one or more downstream network devices of the first network device to obtain the third packet.

In an embodiment, before the second network device receives the first packet sent by the first network device, the method further includes: receiving a first instruction sent by the first network device; determining, based on the first instruction, a first port for transmitting the target packet flow on the second network device; obtaining a fifth dwell time period corresponding to the first port, where the fifth dwell time period is a time determined based on a first another packet flow, and the first another packet flow is a packet flow transmitted through the first port before the second network device obtains the target packet flow; updating the fifth dwell time period based on the target packet flow to obtain a sixth dwell time period; and using the sixth dwell time period as the fourth dwell time period of the target packet flow on the second network device.

In an embodiment, before the second network device receives the first packet sent by the first network device, the method further includes: receiving a second instruction sent by the first network device; obtaining the fourth dwell time period of the target packet flow on the second network device based on the second instruction; and sending the fourth dwell time period to the first network device.

In an embodiment, after the third packet is sent to the next-hop network device of the second network device on the core network transmission path of the target packet flow, the method further includes: receiving a third instruction sent by the first network device, where the third instruction is used for notifying the second network device of first information, and the first information is that the first network device stops obtaining the target packet flow; and updating the sixth dwell time period based on the third instruction to obtain a seventh dwell time period.

According to a second aspect, a packet transmission method is provided.

A first network device obtains a second packet in a to-be-transmitted target packet flow, and obtaining a first dwell time period of the second packet on the first network device, where the first dwell time period is a time difference between a first moment and a second moment, the first moment is a moment at which the second packet enters a queuing system of the first network device, and the second moment is a moment at which the second packet is sent by the first network device after being queued in the queuing system of the first network device.

The first network device obtains a second dwell time period of the target packet flow on the first network device, where the second dwell time period is an upper threshold for a period of dwelling of the target packet flow on the first network device.

The first network device encapsulates the second packet, the first dwell time period of the second packet on the first network device, and the second dwell time period of the target packet flow on the first network device, to obtain a first packet; and sends the first packet to a second network device.

In an embodiment, a core network transmission path of the target packet flow includes another network device other than the first network device, and the encapsulating the second packet, the first dwell time period of the second packet on the first network device, and the second dwell time period of the target packet flow on the first network device, to obtain a first packet includes: encapsulating the second packet, the first dwell time period of the second packet on the first network device, the second dwell time period of the target packet flow on the first network device, and a dwell time period of the target packet flow on the another network device, to obtain the first packet, where the dwell time period of the target packet flow on the another network device is an upper threshold for a period of dwelling of the target packet flow on the another network device.

In an embodiment, before the first network device obtains the second packet in the to-be-transmitted target packet flow, the method further includes: determining a second port for transmitting the target packet flow on the first network device; obtaining an eighth dwell time period corresponding to the second port, where the eighth dwell time period is a time determined based on a second another packet flow, and the second another packet flow is a packet flow transmitted through the second port before the first network device obtains the target packet flow; determining the second dwell time period of the target packet flow on the first network device based on the eighth dwell time period; and storing the second dwell time period of the target packet flow on the first network device.

In an embodiment, before the first network device obtains the second packet in the to-be-transmitted target packet flow, the method further includes: sending a first instruction to another network device, where the first instruction is used by any network device of the another network device to obtain and store a dwell time period of the target packet flow on the any network device.

In an embodiment, before the first network device obtains the second packet in the to-be-transmitted target packet flow, the method further includes: sending a second instruction to the another network device; and receiving the dwell time period of the target packet flow on the another network device sent by the another network device, where the dwell time period of the target packet flow on the another network device is sent by the another network device based on the second instruction.

In an embodiment, after the first packet is sent to the second network device, the method further includes: stopping obtaining the target packet flow, and sending a third instruction to the another network device, where the third instruction is used for notifying the another network device of first information, and the first information is that the first network device stops obtaining the target packet flow.

According to a third aspect, a packet transmission apparatus is provided. The apparatus includes:
a receiving module, configured to receive, by a second network device, a first packet sent by a first network device;
an obtaining module, configured to obtain, by the second network device, a second packet in a target packet flow, a first dwell time period of the second packet on the first network device, and a second dwell time period of the target packet flow on the first network device based on the first packet, where the first dwell time period is a time difference between a first moment and a second moment, the first moment is a moment at which the second packet enters a queuing system of the first network device, the second moment is a moment at which the second packet is sent by the first network device after being queued in the queuing system of the first network device, and the second dwell time period is an upper threshold for a period of dwelling of the target packet flow on the first network device;

a determining module, configured to determine, by the second network device, a time difference between the second dwell time period of the target packet flow on the first network device and the first dwell time period of the second packet on the first network device, where the time difference is an active delay time period of the second packet on the second network device;

the obtaining module is further configured to: obtain a third dwell time period of the second packet on the second network device, and obtain a fourth dwell time period of the target packet flow on the second network device, where the third dwell time period is a time difference between a third moment and a fourth moment, the third moment is a moment at which the second network device ends an active delay of the second packet, the fourth moment is a moment at which the second packet is sent by the second network device after being queued in a queuing system of the second network device, and the fourth dwell time period is an upper threshold for a period of dwelling of the target packet flow on the second network device;

an encapsulation module, configured to encapsulate the third dwell time period of the second packet on the second network device, the fourth dwell time period of the target packet flow on the second network device, and the second packet, to obtain a third packet; and a sending module, configured to send the third packet to a next-hop network device of the second network device on a core network transmission path of the target packet flow after the first packet received by the second network device reaches the active delay time period and is queued in the queuing system of the second network device.

In an embodiment, the core network transmission path of the target packet flow includes one or more upstream network devices of the first network device and one or more downstream network devices of the first network device. The first packet further includes one or more upstream dwell time periods of the target packet flow on the one or more upstream network devices, the one or more upstream dwell time periods are in a one-to-one correspondence with the one or more upstream network devices, and any upstream dwell time period is an upper threshold for a period of dwelling of the target packet flow on an upstream network device. The first packet further includes one or more downstream dwell time periods of the target packet flow on the one or more downstream network devices, the one or more downstream dwell time periods are in a one-to-one correspondence with the one or more downstream network devices, and any downstream dwell time period is an upper threshold for a period of dwelling of the target packet flow on a downstream network device. The encapsulation module is configured to encapsulate the second packet, the third dwell time period of the second packet on the second network device, and the downstream dwell time periods of the target packet flow on the one or more downstream network devices of the first network device, to obtain the third packet.

In an embodiment, the receiving module is further configured to receive a first instruction sent by the first network device. The obtaining module is further configured to: determine, based on the first instruction, a first port for transmitting the target packet flow on the second network device; obtain a fifth dwell time period corresponding to the first port, where the fifth dwell time period is a time determined based on a first another packet flow, and the first another packet flow is a packet flow transmitted through the first port before the second network device obtains the target packet flow; update the fifth dwell time period based on the target packet flow to obtain a sixth dwell time period; and use the sixth dwell time period as the fourth dwell time period of the target packet flow on the second network device.

In an embodiment, the receiving module is further configured to receive a third instruction sent by the first network device, where the third instruction is used for notifying the second network device of first information, and the first information is that the first network device stops obtaining the target packet flow. The obtaining module is further configured to update the sixth dwell time period based on the third instruction to obtain a seventh dwell time period.

In an embodiment, the receiving module is further configured to receive a third instruction sent by the first network device, where the third instruction is used for notifying the second network device of first information, and the first information is that the first network device stops obtaining the target packet flow. The obtaining module is further configured to update the sixth dwell time period based on the third instruction to obtain a seventh dwell time period.

According to a fourth aspect, a packet transmission apparatus is provided. The apparatus includes:

an obtaining module, configured to: obtain, by a first network device, a second packet in a to-be-transmitted target packet flow, and obtain a first dwell time period of the second packet on the first network device, where the first dwell time period is a time difference between a first moment and a second moment, the first moment is a moment at which the second packet enters a queuing system of the first network device, and the second moment is a moment at which the second packet is sent by the first network device after being queued in the queuing system of the first network device; and obtain a second dwell time period of the target packet flow on the first network device, where the second dwell time period is an upper threshold for a period of dwelling of the target packet flow on the first network device;

an encapsulation module, configured to encapsulate the second packet, the first dwell time period of the second packet on the first network device, and the second dwell time period of the target packet flow on the first network device, to obtain a first packet; and a sending module, configured to send the first packet to a second network device.

In an embodiment, a core network transmission path of the target packet flow includes another network device other than the first network device, and the encapsulation module is configured to encapsulate the second packet, the first dwell time period of the second packet on the first network device, the second dwell time period of the target packet flow on the first network device, and a dwell time period of the target packet flow on the another network device, to obtain the first packet, where the dwell time period of the target packet flow on the another network device is an upper threshold for a period of dwelling of the target packet flow on the another network device.

In an embodiment, the apparatus further includes: a determining module, where the determining module is configured to: determine a second port for transmitting the target packet flow on the first network device; obtain an eighth dwell time period corresponding to the second port, where the eighth dwell time period is a time determined based on a second another packet flow, and the second another packet flow is a packet flow transmitted through the second port before the first network device obtains the target packet flow; determine the second dwell time period of the target packet flow on the first network device based on the eighth dwell time period; and store the second dwell time period of the target packet flow on the first network device.

In an embodiment, the sending module is further configured to send a first instruction to the another network device, where the first instruction is used by any network device of the another network device to obtain and store a dwell time period of the target packet flow on the any network device.

In an embodiment, the sending module is further configured to send a second instruction to the another network device. The apparatus further includes: a receiving module, configured to receive the dwell time period of the target packet flow on the another network device sent by the another network device, where the dwell time period of the target packet flow on the another network device is sent by the another network device based on the second instruction.

In an embodiment, the sending module is further configured to: stop obtaining the target packet flow, and sending a third instruction to the another network device, where the third instruction is used for notifying the another network device of first information, and the first information is that the first network device stops obtaining the target packet flow.

According to a fifth aspect, a network device is provided. The network device includes a memory and a processor. The memory stores at least one instruction, and the processor loads and executes the at least one instruction to implement the method provided in any one of the first aspect of this application or the embodiments of the first aspect.

According to a sixth aspect, a network device is provided. The network device includes a memory and a processor. The memory stores at least one instruction, and the processor loads and executes the at least one instruction to implement the method provided in any one of the second aspect of this application or the embodiments of the second aspect.

According to a seventh aspect, a communication apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method in any one of the first aspect or the embodiments of the first aspect.

According to an eighth aspect, a communication apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method in any one of the second aspect or the embodiments of the second aspect.

Optionally, there are one or more processors, and there are one or more memories.

Optionally, the memory and the processor may be integrated together, or the memory and the processor may be separately disposed.

In an embodiment, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

According to a ninth aspect, a packet transmission system is provided. The system includes a first network device and a second network device, and the first network device and the second network device are communicatively connected. The first network device is configured to perform any packet transmission method in the first aspect, and the second network device is configured to perform any packet transmission method in the second aspect.

According to a tenth aspect, a computer program (product) is provided, where the computer program (product) includes computer program code. When the computer program code is run by a computer, the computer is enabled to perform the methods in the foregoing aspects.

According to an eleventh aspect, a readable storage medium is provided. The readable storage medium stores a program or instructions. When the program or the instructions is/are run on a computer, the methods in the foregoing aspects are performed.

According to a twelfth aspect, a chip is provided, including a processor, configured to invoke and run instructions stored in a memory, so that a communication device in which the chip is installed performs the methods in the foregoing aspects.

According to a thirteenth aspect, a chip is provided, including an input interface, an output interface, a processor, and a memory. The input interface, the output interface, the processor, and the memory are connected through an internal connection channel. The processor is configured to execute code in the memory, and when the code is executed, the processor is configured to perform the methods in the foregoing aspects.

BRIEF DESCRIPTION OF DRAWINGS

FIG. 8A and FIG. 8B are a flowchart of a packet transmission method according to an embodiment of this application;

DESCRIPTION OF EMBODIMENTS

Terms used in embodiments of this application are only used to explain specific embodiments of this application, but are not intended to limit this application.

On an IP network, a network device usually uses a line-rate processing mechanism to transmit a packet. Line-rate refers to a maximum data amount that can be processed by the network device. Therefore, when the total data amount of the packets received by the network device exceeds the maximum data amount that can be processed by the network device, the network device can transmit only a part of packets of all received packets. This causes packet squeeze.

Figure 1:
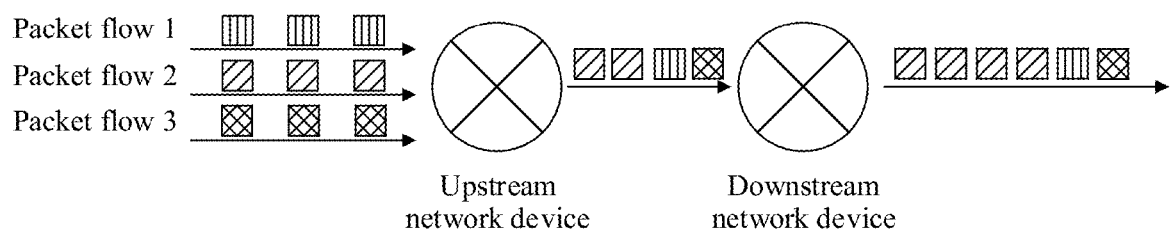
FIG. 1 is a schematic diagram of a transmission scenario according to an embodiment of this application.

A scenario shown in FIG. 1 is used as an example. An upstream network device simultaneously receives three to-be-transmitted packet flows, and packet gaps included in the received packet flows are even. Because the upstream network device uses the line-rate processing mechanism, packets included in a packet flow obtained by processing by the upstream network device are squeezed by each other, and a packet gap is reduced. Therefore, compared with the packet flows received by the upstream network device, a burst of the packet flow processed by the upstream network device increases, to form a microburst. Because the packet flow processed by the upstream network device continues to be transmitted to another downstream network device, the foregoing process of forming a microburst is repeated continuously. After transmission by a downstream network device, accumulated microbursts form a large burst. The packet flow with the large burst may further squeeze other packet flows in the network, so that a delay and a jitter of each packet flow in the network increase to an unpredictable value, and both the delay and the jitter are uncertain.

In this case, a microburst generated in a packet transmission process needs to be eliminated, so that in a process in which a packet is transmitted through a plurality of network devices, in other words, in a process in which the packet is transmitted between ends, a delay and a jitter of the packet can be kept at a value that is lower than an upper limit and that can be predicted. Such delay and jitter of the packet are also called deterministic delay. An IP network that can enable a packet to have a deterministic delay is also called a deterministic network. At present, deterministic networks are a hot topic in the industry. Services such as the industrial internet, smart factory, programmable logic controller (PLC) remote transmission, cloudification, augmented reality (AR)/virtual reality (VR) real-time interaction, remote surgery, and tactile internet all require deterministic networks. Therefore, it is necessary to provide a packet transmission method that can eliminate microburst accumulation, to ensure that a packet has a deterministic delay.

Figure 2:
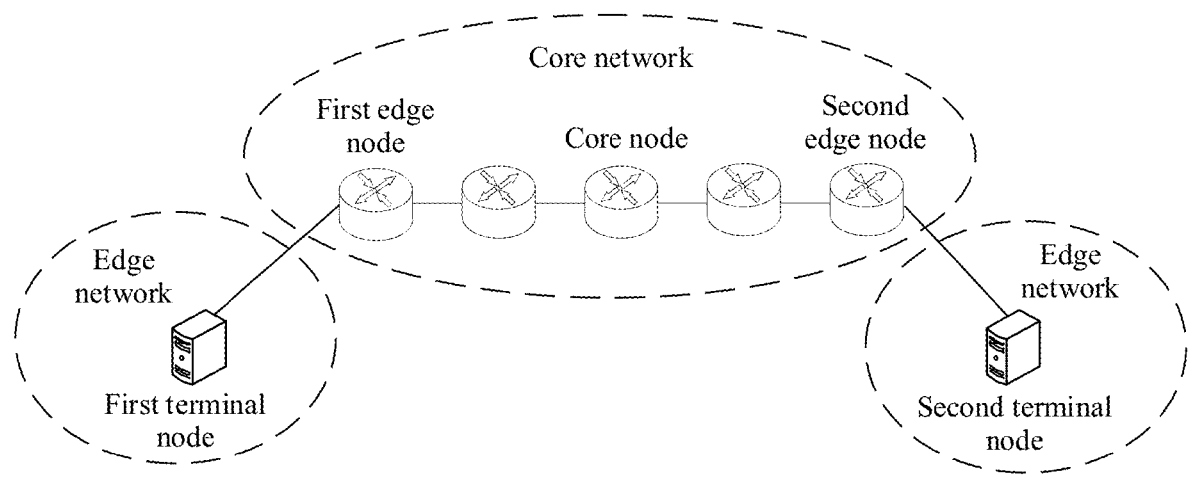
FIG. 2 is a schematic diagram of an implementation environment according to an embodiment of this application.

Based on this, an embodiment of this application provides a packet transmission method. The method may be applied to a network architecture shown in FIG. 2. For example, the network architecture includes but is not limited to a large-scale operator network, a small-scale campus network, and another type of IP network. FIG. 2 includes a first terminal node, a first edge node, a core node, a second edge node, and a second terminal node that are communicatively connected in sequence. For example, the first edge node and the second edge node are gateway devices, and the core node is a router.

In the network architecture shown in FIG. 2, the first terminal node and the first edge node form an edge network, the second terminal node and the second edge node form another edge network, and the first edge node, the core node, and the second edge node form a core network. When end-to-end packet transmission is performed between the first terminal node and the second terminal node, in response to that a packet transmission direction is from the first terminal node to the second terminal node, the first edge node is an ingress edge node for a packet to enter the core network, and the second edge node is an egress edge node for the packet to leave the core network. Alternatively, in response to that a packet transmission direction is from the second terminal node to the first terminal node, the second terminal node is an ingress edge node, and the first terminal node is an egress edge node. For example, the packet transmission direction is from the first terminal node to the second terminal node. In this case, a packet sent by the first terminal node first enters the edge network, and then enters the core network through the first edge node. Then, the packet is forwarded by each core node in the core network, enters another edge network through the second edge node, and finally reaches the second terminal node. It can be learned that the first terminal node, the first edge node, the core node, the second edge node, and the second terminal node form a transmission path of the packet. Therefore, that a packet has a deterministic delay in this embodiment means that in a process of transmitting the packet from the first terminal node to the second terminal node (or transmitting the packet from the second terminal node to the first terminal node), a delay and a jitter of the packet on the transmission path are always not greater than a predictable upper limit that can be determined.

In addition, the network architecture shown in FIG. 2 needs to meet the following conditions:

Condition 1: Each port of each node included in the transmission path of the packet reserves a bandwidth (Ri) for a packet flow (Flow i) in which the packet is located. The bandwidth reserved by the port is a bandwidth required for transmitting the packet flow.

Condition 2: When the first terminal node sends the packet flow in which the packet is located, a data amount of the packet flow meets the following formula (1):

$$A_i(t)=R_i \cdot t+B_i \qquad (1), \text{where}$$

$A_i$ is a total data amount of the packet flow within a time period t, $R_i$ is an average rate of the packet flow, and $B_i$ is a maximum burst of the packet flow.

Condition 3: If the packet flow in which the packet sent by the first terminal node is located does not meet the foregoing formula, the first edge node performs leaky bucket shaping on the packet flow. A packet flow on which leaky bucket shaping is performed meets the foregoing formula, to ensure that all packet flows entering the core network are packet flows that meet the foregoing formula.

Figure 3A:
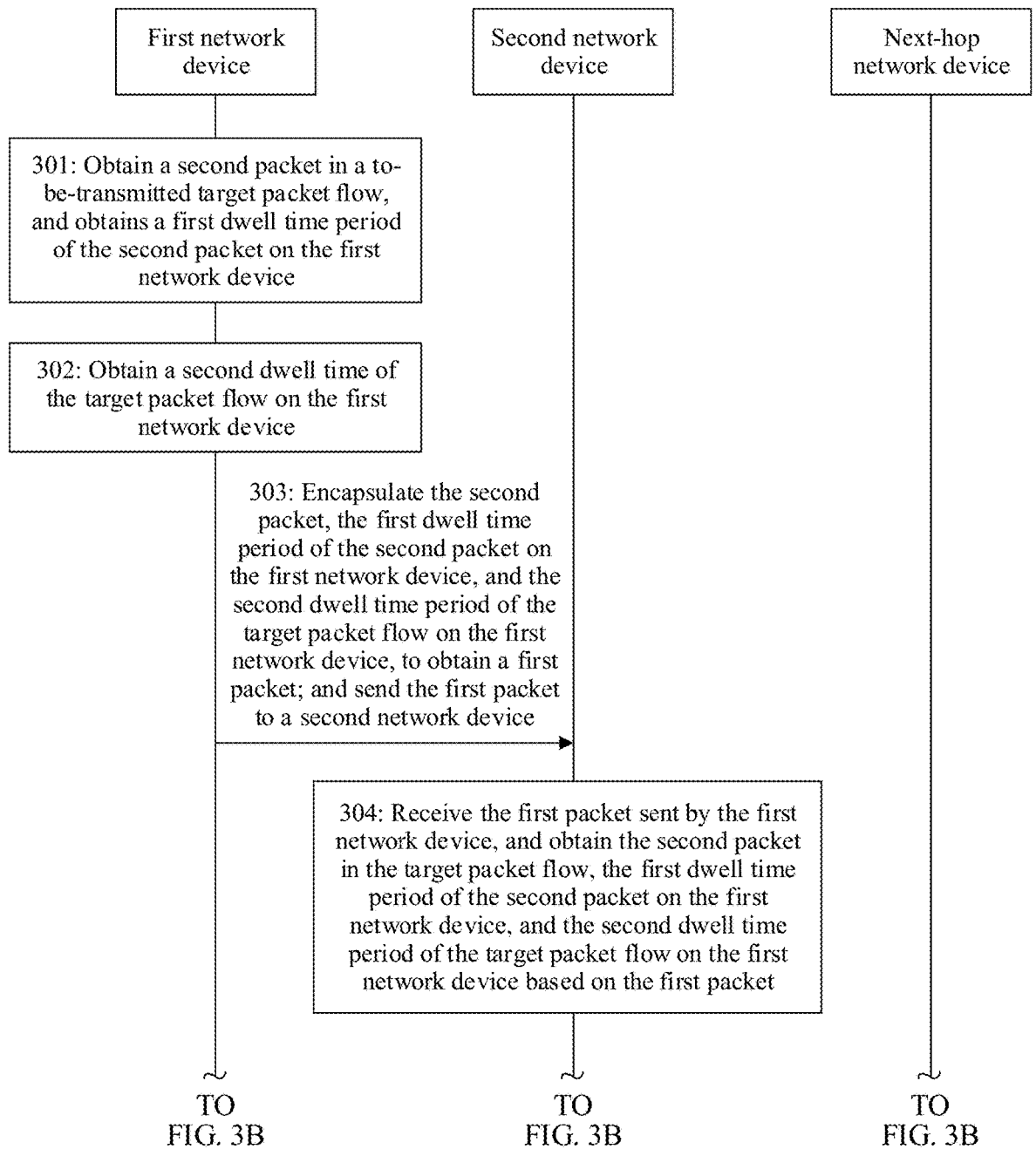
FIG. 3A and FIG. 3B are a flowchart of a packet transmission method according to an embodiment of this application.
Figure 3B:
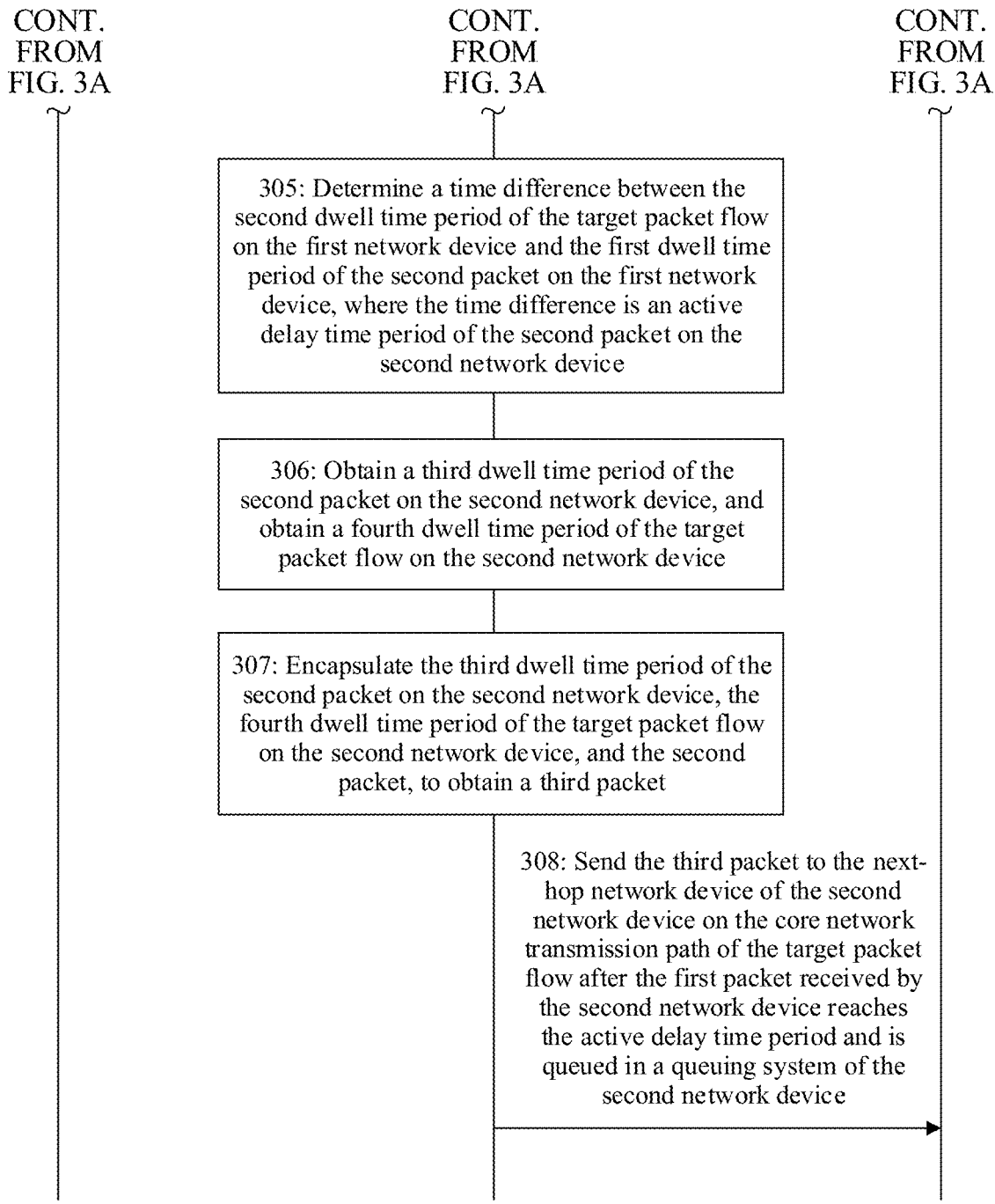

Based on the network architecture shown in FIG. 2, an embodiment of this application provides a packet transmission method. The method may be implemented through interaction between a first network device and a second network device. As shown in FIG. 3A and FIG. 3B, the method includes the following processes 301 to 308.

301: The first network device obtains a second packet in a to-be-transmitted target packet flow, and obtains a first dwell time period of the second packet on the first network device.

In a process of transmitting the second packet in the target packet flow, the first network device is a device configured to send the second packet, a next hop of the first network device is the second network device, and the second network device is a device configured to receive the second packet sent by the first network device. Certainly, both the first network device and the second network device are devices that have both a packet sending function and a packet receiving function, and the first network device and the second network device may use different functions as required.

Figure 4:
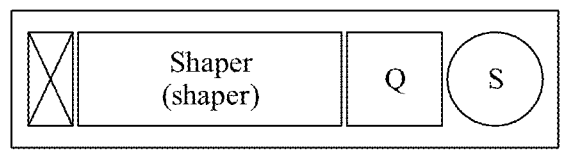
FIG. 4 is a schematic diagram of a structure of a first network device according to an embodiment of this application.

For example, the first network device includes a shaper (shaper), a queuing system (queuing system), and a scheduler (scheduler). The shaper is configured to: when a data amount of the target packet flow does not meet the foregoing formula (1), shape the data amount of the target packet flow, so that the data amount of the target packet flow meets the foregoing formula (1). After the data amount of the target packet flow meets the foregoing formula (1), a packet included in the target packet flow enters the queuing system of the first network device. The queuing system of the first network device configured to form a packet queue of packets in the first network device, and the packets are queued in the packet queue and wait to be sent by the scheduler. For a schematic diagram of a structure of the first network device, refer to FIG. 4. In FIG. 4, a shaper represents the shaper, Q represents the queuing system, and S represents the scheduler. It can be understood that the packets in the first network device include the second packet, a packet other than the second packet in the target packet flow, and a packet in another packet flow other than the target packet flow. The scheduler is configured to sequentially send the packets to the second network device based on a sequence of the packet queue.

Figure 5:
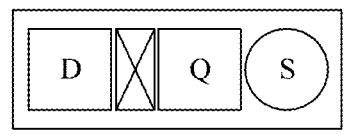
FIG. 5 is a schematic diagram of a structure of a second network device according to an embodiment of this application.

The second network device includes a damper, a queuing system, and a scheduler. For a schematic diagram of a structure of the second network device, refer to FIG. 5. D in FIG. 5 represents the damper. It should be noted that, a module between D and Q in FIG. 5 is a switching network. A case in which D is located before the switching network shown in FIG. 5 is merely an example. In this embodiment, D may be located at any position before Q, for example, D may also be located after the switching network. The second packet is used as an example. After the second network device receives the second packet sent by the first network device, the damper is configured to actively delay the received second packet for reference duration, and release the second packet after the reference duration. In this way, the second packet can enter the queuing system in the second network device, and wait, in the queuing system, to be sent to a next-hop network device of the second network device. A manner in which the damper determines the reference duration is described in 305 below, and details are not described herein.

It should be noted that, the foregoing description is specific to a case in which the first network device includes the shaper, the queuing system, and the scheduler, and there is no other upstream network device of the first network device. If there is another upstream network device of the first network device, the first network device has a same structure with the second network device. In other words, the first network device includes a damper, a queuing system, and a scheduler.

Based on the structure of the first network device, the first dwell time period of the second packet on the first network device is a time difference between a first moment and a second moment. If there is no other upstream network device of the first network device, in other words, the structure of the first network device includes the shaper, the queuing system, and the scheduler, any moment of the second packet on the first network device can be used as the first moment. For example, the first moment includes but is not limited to a moment at which the first network device receives the second packet, a moment at which the second packet is released by the shaper of the first network device, a moment at which the second packet enters the queuing system of the first network device, and a moment at which the second packet is sent by the first network device. For example, refer to FIG. 6. In this embodiment, the moment at which the second packet enters the queuing system in the first network device may be used as the first moment. If there is another upstream network device of the first network device, in other words, the structure of the first network device includes the damper, the queuing system, and the scheduler, the first moment may also be considered as a moment at which the second packet is released by the damper of the first network device after being actively delayed by the damper of the first network device. In addition, the second moment is a moment at which the second packet is sent by the first network device after being queued in the queuing system in the first network device. For example, when the second packet enters the queuing system in the first network device, the first network device adds a first timestamp indicating the first moment to the second packet. When the second packet leaves the scheduler, the first network device adds a second timestamp indicating the second moment to the second packet. Therefore, the first dwell time period of the second packet on the first network device can be calculated by using the first timestamp and the second timestamp.

The following describes moments in this embodiment of this application. It can be understood that the described moments include the first moment and the second moment described above, and also include a third moment and a fourth moment described below.

For a network device such as a router, time precision that can be identified and expressed by the network device is limited. In an embodiment, time precision is arranged in ascending order of magnitude, and the time precision includes but is not limited to: an attosecond (as), a femtosecond (fs), a picosecond (ps), a nanosecond (ns), a microsecond (μs), a millisecond (ms), a second (s), and a minute (min). Certainly, the time precision is merely an example, and is not used to limit the time precision. The time precision is set based on an actual requirement. For example, the time precision further includes time precision less than as, or time precision greater than min.

For example, precision of a moment is the same as the precision that can be identified and expressed by network device such as the router. An actual occurrence time of the moment includes any time within the time precision. For example, when the time precision that can be identified and expressed by the network device is 1 ns, the precision of the moment is also 1 ns. If a moment 1 is 1 μs to 1 ns, an actual occurrence time of the moment 1 includes any time within time precision from 1 μs to 1 ns to 1 μs to 2 ns, for example, 1 μs to 1.1 ns or 1 μs to 1.99 ns.

For example, the precision of the moment includes a set precision range, and the actual occurrence time of the moment includes any time within the precision range. For example, if the precision range is 10 μs, the precision of the moment is also 10 μs. For example, if the moment 1 is 13 μs, the actual occurrence time of the moment 1 includes any time within a precision range of 13 μs to 23 μs, for example, 15 μs, 16 μs, or 18 μs.

For example, the moment is represented by a number obtained through setting. The time is divided into a plurality of moments according to a reference granularity, and each moment is represented by a number. For example, one minute is used as the reference granularity, 24 hours are divided into 1440 moments, and each moment is represented by an Arabic numeral. For example, 0 indicates 00:00 to 00:01, 1 indicates 00:01 to 00:02, and so on. If the moment 1 is 16, an actual occurrence time of the moment 1 includes any time from 0:16 to 0:17, for example, 0:16:08, 0:16:31, and 0:16:59.

302: The first network device obtains a second dwell time period of the target packet flow on the first network device.

The second dwell time period of the target packet flow on the first network device is an upper threshold for a period of dwelling of the target packet flow on the first network device. If there is no other upstream network device of the first network device, the upper threshold is a possible maximum value from the first moment to the second moment. If there is another upstream network device of the first network device, the upper threshold is a maximum time period in which the target packet flow can dwell on the first network device. In this embodiment, each packet flow on the first network device has a corresponding second dwell time period, and second dwell time periods of different packet flows on the first network device are the same or different.

In an embodiment, before the first network device obtains the to-be-transmitted second packet, the method further includes: determining a second port for transmitting the target packet flow on the first network device, and obtaining an eighth dwell time period corresponding to the second port, where the eighth dwell time period is a time period determined based on a second another packet flow, and the second another packet flow is a packet flow transmitted through the second port before the first network device obtains the target packet flow; and determining the second dwell time period of the target packet flow on the first network device based on the eighth dwell time period, and storing the second dwell time period of the target packet flow on the first network device.

The first network device may include a plurality of transmission ports, and each transmission port is configured to transmit one or more packet flows. The second port for transmitting the target packet flow on the first network device is one of the plurality of transmission ports, and the target packet flow may be transmitted from the first network device to the second network device through the second port. For example, the eighth dwell time period corresponding to the second port is calculated by the first network device, or is delivered by a network management device in a control plane to the first network device. In the foregoing case, the first network device calculates the eighth dwell time period corresponding to the second port by using a network calculus theory and based on a related parameter of the second another packet flow. The second another packet flow is a packet flow transmitted through the second port before the first network device obtains the target packet flow, namely, a packet flow transmitted through the second port when the first network device calculates the eighth dwell time period. The related parameter of the second other packet flow includes but is not limited to an average flow rate of all second other packet flows and a burst corresponding to each second another packet flow.

It should be noted that the first network device uses the network calculus theory as a basis in a process of calculating the eighth dwell time period corresponding to the second port, and the network calculus theory indicates that any packet flow passing through the second port affects the eighth dwell time period corresponding to the second port. Therefore, if a quantity of packet flows passing through the second port increases, the eighth dwell time period corresponding to the second port also increases. If a quantity of packet flows passing through the second port decreases, the eighth dwell time period corresponding to the second port also decreases. In this embodiment, the second port is configured to transmit the second another packet flow before the target packet flow is obtained. Therefore, after the first network device obtains the target packet flow, the quantity of packet flows that pass through the second port increases. Therefore, the eighth dwell time period corresponding to the second port needs to be updated based on the target packet flow to obtain a ninth dwell time period, and the ninth dwell time period is greater than the eighth dwell time period. That the eighth dwell time period corresponding to the second port is updated based on the target packet flow to obtain a ninth dwell time period includes: using a sum of a delay that can be caused by the target packet flow and the eighth dwell time period as the ninth dwell time period. Correspondingly, the determining the second dwell time period of the target packet flow on the first network device based on the eighth dwell time period includes: using the ninth dwell time period obtained by updating the eighth dwell time period as the second dwell time period.

In an embodiment, for any packet flow on any network device, $D_i^h$ represents a second dwell time period of the any packet flow on the any network device. The subscript i is used for distinguishing between different packet flows, and the superscript h is used for distinguishing between different network devices. For example, the target packet flow is an $i^{th}$ packet flow, and the first network device is a $1^{st}$ network device. In this case, the second dwell time period of the target packet flow on the first network device is $D_i^1$.

After the first network device obtains the second dwell time period of the target packet flow on the first network device, the first network device stores the second dwell time period. In this case, after obtaining the to-be-transmitted second packet, the first network device may obtain the second dwell time period by reading. For example, in this embodiment, the target packet flow is identified by using a 5-tuple. The 5-tuple includes a source IP address, a source port, a destination IP address, a destination port, and a transport layer protocol. All packets included in the target packet flow each carry a 5-tuple corresponding to the target packet flow. In a storage process, the first network device correspondingly stores the second dwell time period and the 5-tuple corresponding to the target packet flow. Correspondingly, after the first network device obtains the second packet, because the second packet carries the 5-tuple corresponding to the target packet flow, it may be determined that the second packet belongs to the target packet flow, so that the first network device reads the second dwell time period corresponding to the 5-tuple. Certainly, in this embodiment, not only the foregoing 5-tuple can be used as a packet flow identifier, and an identification manner may be selected based on experience or an actual requirement. For example, in this embodiment, a packet flow can alternatively be identified by using a 3-tuple.

It should be noted that, a delay that can be caused by the target packet flow needs to be applied to calculating the second dwell time period of the target packet flow on the first network device. Therefore, only when the first network device has obtained the target packet flow before obtaining the second packet, calculation of the second dwell time period can be completed before the first network device obtains the second packet, so that the first network device can obtain the second dwell time period by reading the second packet after obtaining the second packet. In other words, if the first network device does not obtain the target packet flow before obtaining the second packet, that is, the first network device obtains the target packet flow for the first time only when obtaining the second packet, the second dwell time period needs to be calculated after the second packet is obtained. Whenever the second dwell time period is calculated, for a calculation manner, refer to the foregoing descriptions.

In addition, 301 and 302 are not subject to a specific sequence in this embodiment. The sequence includes but is not limited to: perform 301 before 302, perform 302 before 301, and perform 301 and 302 simultaneously.

303: The first network device encapsulates the second packet, the first dwell time period of the second packet on the first network device, and the second dwell time period of the target packet flow on the first network device, to obtain a first packet, and sends the first packet to the second network device.

In an encapsulation process, in an embodiment, the first dwell time period, the second dwell time period, and the second packet may be directly encapsulated, to obtain the first packet. Alternatively, a time difference between the second dwell time period and the first dwell time period may be calculated, and then the calculated time difference and the second packet are encapsulated, to obtain the first packet. The time difference is an active delay time period of the second packet on the second network device, and the damper in the second network device is configured to actively delay the second packet based on the time difference obtained through of calculation. A process of active delaying is described below, and details are not described herein.

304: The second network device receives the first packet sent by the first network device, and obtains the second packet in the target packet flow, the first dwell time period of the second packet on the first network device, and the second dwell time period of the target packet flow on the first network device based on the first packet.

If the first network device directly encapsulates the first dwell time period, the second dwell time period, and the second packet, the second network device can obtain, by parsing the first packet, the first dwell time period, the second dwell time period, and the second packet that are included in the first packet. If the first network device encapsulates the second packet and the time difference between the second dwell time period and the first dwell time period, the second network device can obtain the time difference between the second dwell time period and the first dwell time period and the second packet through parsing.

It should be noted that, in an embodiment, a transmission time period required for transmitting the first packet from the first network device to the second network device may be ignored. In other words, it may be considered that a moment at which the second network device receives the first packet sent by the first network device and a second moment at which the first network device sends the first packet are a same moment. In addition, because the second network device includes the damper, the queuing system, and the scheduler, the moment at which the second network device receives the first packet may also be considered as a moment at which the second packet enters the damper of the second network device after the second network device obtains the second packet based on the first packet.

305: The second network device determines the time difference between the second dwell time period of the target packet flow on the first network device and the first dwell time period of the second packet on the first network device, where the time difference is the active delay time period of the second packet on the second network device.

If the second network device obtains the first dwell time period, the second dwell time period, and the second packet through parsing, the second network device performs difference calculation between the second dwell time period and the first dwell time period, to obtain the time difference. If the second network device obtains the time difference between the second dwell time period and the first dwell time period and the second packet through parsing, the second network device has obtained the time difference in a parsing process, and therefore does not need to perform calculation again. It can be understood that a value of the time difference is not less than zero.

306: The second network device obtains a third dwell time period of the second packet on the second network device, and obtains a fourth dwell time period of the target packet flow on the second network device.

Based on the structure of the second network device, after the time difference between the second dwell time period and the first dwell time period is determined, the damper in the second network device actively delays the second packet based on the time difference. In an active delay process, the second packet dwells in the damper of the second network device, and does not enter the queuing system and the scheduler of the second network device. After duration of receiving the first packet reaches the active delay time period, the second network device releases the second packet through the damper, so that the second packet can enter the queuing system of the second network device. After the second packet enters the queuing system of the second network device, the second network device may further obtain the third dwell time period and the fourth dwell time period.

Figure 6:
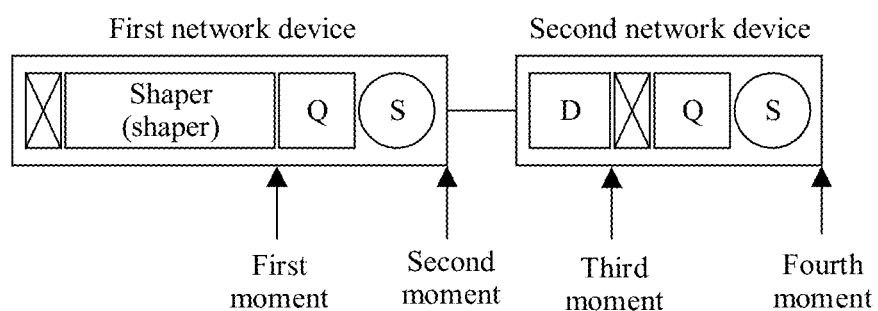
FIG. 6 is a schematic diagram of a moment according to an embodiment of this application.

Referring to FIG. 6, the third dwell time period of the second packet on the second network device is a time difference between a third moment and a fourth moment. The third moment is a moment at which the second network device ends an active delay of the second packet, and the third moment is a moment at which the second packet is released by the damper of the second network device after the damper of the second network device performs active delay on the second packet, or is a moment at which the second packet enters the queuing system of the second network device. The fourth moment is a moment at which the second packet is sent by the second network device after being queued in the queuing system of the second network device, or is a moment at which the second packet leaves the scheduler of the second network device. It can be learned that the third dwell time period is actually a sum of a dwell time period of the second packet in the queuing system and the scheduler in the second network device. The fourth dwell time period is an upper threshold for a period of dwelling of the target packet flow on the second network device, namely, a maximum time period in which the target packet flow can dwell on the second network device.

For a manner in which the second network device obtains the third dwell time period, refer to the description in 301. In an embodiment, the second network device may obtain the fourth dwell time period based on a first instruction sent by the first network device. Refer to the following processes 3061 and 3062.

3061: Before the first network device obtains the to-be-transmitted second packet, the first network device sends the first instruction to other network devices.

The other network devices are network devices other than the first network device on a core network transmission path of the target packet flow. The first network device may determine the other network devices by determining the core network transmission path of the target packet flow. In a process of determining the core network transmission path of the target packet flow, the first network device may determine a destination IP address of the target packet flow based on the 5-tuple corresponding to the target packet flow. Then, a stored routing table is queried based on the destination IP address of the target packet flow, to determine the core network transmission path of the target packet flow.

For example, after determining the core network transmission path, the first network device may separately send resource reservation signaling to each network device in the other network devices, and each network device that receives the resource reservation signaling separately reserves a corresponding bandwidth for the target packet flow, so that the target packet flow can be normally transmitted subsequently. For any network device that receives the resource reservation signaling, if the any network device successfully reserves a bandwidth, the any network device feeds back reservation success signaling to the first network device. When all the other network devices feed back reservation success signaling to the first network device, the first network device may determine that the core network transmission path can be used for transmitting the target packet flow, and further send the first instruction to each network device in the other network devices. Correspondingly, when only a part of the other network devices feed back reservation success signaling to the first network device, the first network device needs to re-determine a core network transmission path of the target packet flow for one or more times, until all the other network devices feed back reservation success signaling to the first network device on the re-determined core network transmission path. Then, the first network device sends the first instruction to each network device in the other network devices on the re-determined core network transmission path.

It may be understood that the other network devices may include one or more upstream network devices of the first network device and one or more downstream network devices of the first network device. For example, that the first network device sends a first instruction to other network devices includes: The first network device sends the first instruction to the one or more downstream network devices of the first network device in the other network devices. The method provided in this embodiment is implemented through interaction between the first network device and the second network device. Therefore, the core network transmission path includes at least the first network device and the second network device, and may further include one or more network devices used as a core node. In this case, the network devices on the core network transmission path other than the first network device include at least the second network device.

In an embodiment, the first instruction sent by the first network device is used by any network device in the other network devices, to obtain and store a dwell time period of the target packet flow on the any network device. If the other network devices further include one or more network devices in addition to the second network device, each network device performs a same operation as the second network device after receiving the first instruction. Therefore, in 3062, the second network device is used as an example to describe an operation performed based on the first instruction by each network device that receives the first instruction.

3062: The second network device receives the first instruction sent by the first network device, and obtains and stores the fourth dwell time period of the target packet flow on the second network device based on the first instruction.

In an embodiment, that the second network device obtains a fourth dwell time period of the target packet flow on the second network device includes: determining a first port for transmitting the target packet flow on the second network device; obtaining a fifth dwell time period corresponding to the first port, where the fifth dwell time period is a time determined based on a first another packet flow, and the first another packet flow is a packet flow transmitted through the first port before the second network device obtains the target packet flow; and updating the fifth dwell time period based on the target packet flow to obtain a sixth dwell time period; and using the sixth dwell time period as the fourth dwell time period of the target packet flow on the second network device. After receiving the first instruction, the second network device may obtain the fourth dwell time period according to the method in this embodiment. For a process in which the second network device obtains the fourth dwell time period, refer to the description of a process in which the first network device obtains the second dwell time period in 302. Details are not described herein again.

In the second network device, considering that a subsequent process of transmitting the target packet flow through the first port affects a process of transmitting the first another packet flow through the first port, a delay of the first another packet flow in a transmission process increases. Therefore, after the fifth dwell time period corresponding to the first port is updated to the sixth dwell time period, an upper threshold for a period of dwelling of the first another packet flow on the second network device further needs to be updated based on the sixth dwell time period, to ensure that the first another packet flow also has a deterministic delay in the transmission process.

For example, for any packet flow in the first another packet flow, if an upper threshold for a period of dwelling of the any packet flow on the second network device is less than the sixth dwell time period corresponding to the first port, the upper threshold for a period of dwelling of the any packet flow on the second network device is updated to the sixth dwell time period. If the upper threshold for a period of dwelling of the any packet flow on the second network device is not less than the sixth dwell time period, the upper threshold for a period of dwelling of the any packet flow on the second network device does not need to be updated.

After the second network device obtains the fourth dwell time period based on the first instruction, the second network device stores the fourth dwell time period, for example, correspondingly stores the fourth dwell time period and a 5-tuple or a 3-tuple corresponding to the target packet flow, so that the stored fourth dwell time period can be read when required. In addition, if the other network devices further include one or more network devices in addition to the second network device, because each network device performs a same operation as the second network device after receiving the first instruction, any network device in the other network devices obtains and stores a dwell time period of the target packet flow on the any network device, to ensure normal transmission of the target packet flow.

307: The second network device encapsulates the third dwell time period of the second packet on the second network device, the fourth dwell time period of the target packet flow on the second network device, and the second packet, to obtain a third packet.

In an encapsulation process, the second network device may directly encapsulate the third dwell time period, the fourth dwell time period, and the second packet, or may first calculate a time difference between the fourth dwell time period and the third dwell time period, and then encapsulate the second packet and the time difference between the fourth dwell time period and the third dwell time period, to obtain the third packet.

It should be noted that the operations performed by the second network device in the foregoing description are all for a case in which the second network device is not a last network device on the core network transmission path of the target packet flow. If the second network device is the last network device on the core network transmission path of the target packet flow, the second network device needs to send the second packet to a terminal node that has a destination IP address of the second packet. Because there is usually no damper disposed on the terminal node, the second network device does not need to obtain the third dwell time period and the fourth dwell time period of the second packet on the second network device, but directly encapsulates the second packet and other information required for transmitting the second packet.

308: The second network device sends the third packet to a next-hop network device of the second network device on the core network transmission path of the target packet flow after the first packet received by the second network device reaches the active delay time period and is queued in the queuing system of the second network device.

The active delay time period is a time period in which the second packet dwells in the damper of the second network device. After the first packet received by the second network device reaches the active delay time period, the second packet enters the queuing system of the second network device. Then, the second packet can be sent by the second network device after being queued in the queuing system of the second network device. An entire time period in which the second packet dwells on the second network device is a sum of the active delay time period and a time period for queuing in the queuing system of the second network device. Therefore, after the first packet received by the second network device reaches the active delay time period and is queued in the queuing system of the second network device, the second network device can send the third packet.

Figure 7:
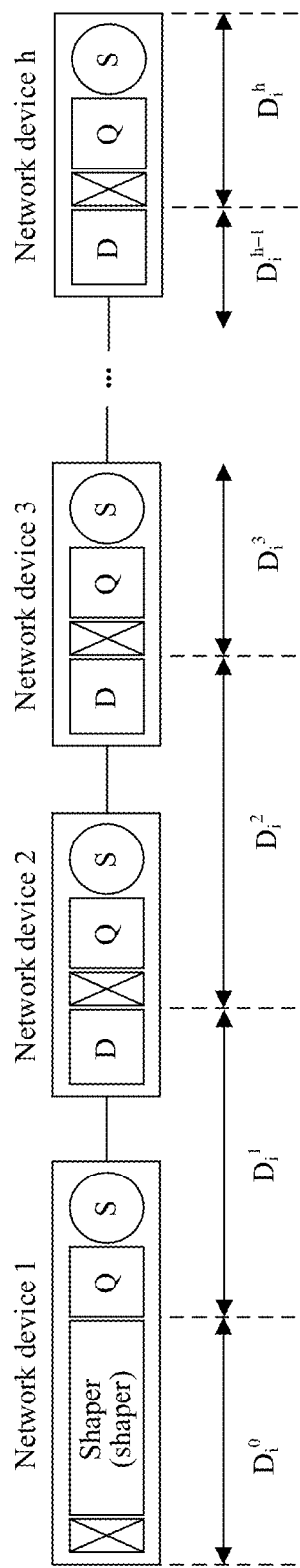
FIG. 7 is a schematic diagram of a network architecture according to an embodiment of this application.

In a transmission process of the second packet, each pair of adjacent network devices on the core network transmission path of the target packet flow interact with each other according to the method described in 301 to 308, to ensure that a delay of the second packet between each pair of adjacent network devices is deterministic, and further ensure that a delay of the second packet between two terminal nodes is deterministic. FIG. 7 is a case in which the core network transmission path of the target packet flow includes h network devices in total. Delays $D_i^1, D_i^2, D_i^3, \ldots,$ and $D_i^{h-1}$ between each pair of neighboring network devices on the core network transmission path may be determined according to the method in the foregoing descriptions 301 to 308. In addition, a maximum dwell time period of the second packet in a shaper of a $1^{st}$ network device on the core network transmission path is recorded as $D_i^0$, and a dwell time period of the second packet in a queuing system and a scheduler of a last network device on the core network transmission path is recorded as $D_i^h$. An upper delay limit of the second packet between two terminal nodes may be expressed as the following formula (2):

$$D=D_i^0+D_i^1+D_i^2+D_i^3+\ldots+D_i^{h-1}+D_i^h \qquad (2)$$

It can be understood that, in the upper delay limit calculated according to the formula (2), a time period in which the second packet is transmitted from a terminal node configured to send the second packet to the $1^{st}$ network device on the core network transmission path, a time period in which the second packet is transmitted between each pair of adjacent network devices on the core network transmission path, and a time period in which the second packet is transmitted from the last network device on the core network transmission path to a terminal node configured to receive the second packet are ignored.

In actual application, $D_i^1, D_i^2, D_i^3, \ldots,$ and $D_i^{h-1}$ are all calculated time periods. Therefore, only $D_i^0$ and $D_i^h$ affect a delay of the second packet, and an upper jitter limit of the second packet between two terminal nodes is $D_i^0+D_i^h$. It can be learned that, when the second packet is transmitted between the two terminal nodes, the delay of the second packet is less than the upper delay limit D, and a jitter of the second packet is less than the upper jitter limit $D_i^0+D_i^h$. Therefore, it can be learned with reference to a definition of the deterministic delay that, according to the method described in 301 to 308, it can be ensured that the second packet has a deterministic delay in a transmission process between two terminal nodes.

Figure 8A:
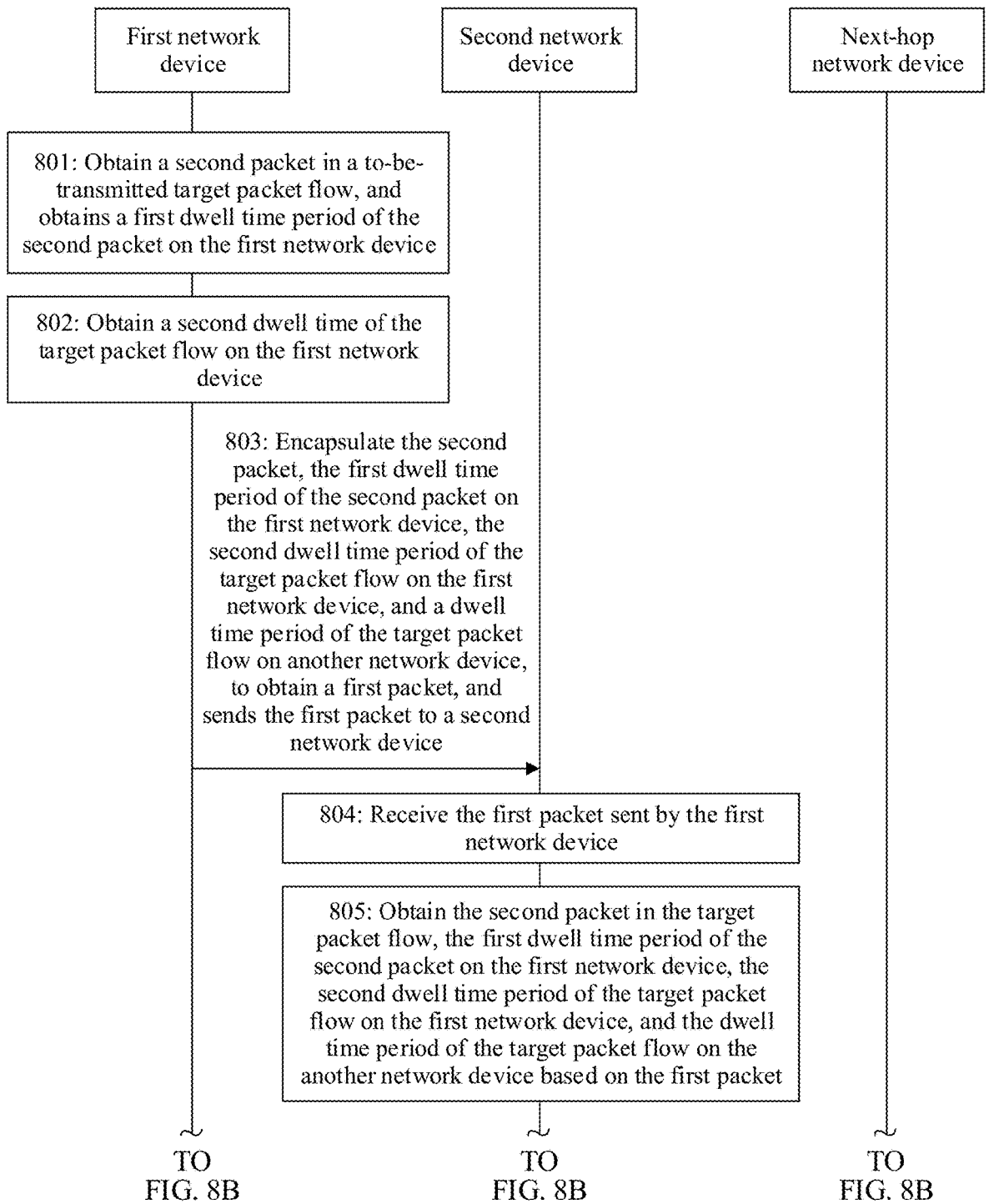

Based on the network architecture shown in FIG. 2, an embodiment of this application further provides another packet transmission method. Refer to FIG. 8A and FIG. 8B. The method includes the following processes 801 to 809.

801: A first network device obtains a second packet in a to-be-transmitted target packet flow, and obtains a first dwell time period of the second packet on the first network device.

802: The first network device obtains a second dwell time period of the target packet flow on the first network device.

For 801, refer to the description in 301. For 802, refer to the description in 302. Details are not described herein again.

803: The first network device encapsulates the second packet, the first dwell time period of the second packet on the first network device, the second dwell time period of the target packet flow on the first network device, and a dwell time period of the target packet flow on another network device, to obtain a first packet, and sends the first packet to a second network device.

The dwell time period of the target packet flow on the another network device is an upper threshold for a period of dwelling of the target packet flow on the another network device. It can be learned from the description in 3061 that, the another network device may include one or more upstream network devices of the first network device and one or more downstream network devices of the first network device. For example, when performing encapsulation, the first network device encapsulates only a dwell time period of the target packet flow on one or more network devices downstream of the first network device. A reason is that in a process of transmitting the second packet, each downstream network device of the first network device does not need to use a dwell time period of the target packet flow on one or more upstream network devices of the first network device. In this encapsulation manner, a bandwidth that needs to be occupied in the transmission process can be reduced, and a waste of network resources can be avoided.

Before obtaining the to-be-transmitted second packet, the first network device further needs to obtain the dwell time period of the target packet flow on the another network device according to the following processes 8031 to 8033.

8031: The first network device sends a second instruction to the another network device.

The first network device interacts with the another network device on a core network transmission path by sending the second instruction, so that the first network device obtains the dwell time period of the target packet flow on the another network device. For example, the first network device sends the second instruction to one or more downstream network devices that are of the first network device and that are in other network devices. Each network device that receives the second instruction performs a same operation as the second network device. Therefore, the second network device is used as an example for description in operation 8032 and operation 8033.

8032: The second network device receives the second instruction sent by the first network device, obtains a fourth dwell time period of the target packet flow on the second network device based on the second instruction, and sends the fourth dwell time period to the first network device.

For a process in which the second network device obtains the fourth dwell time period based on the second instruction, refer to the process in which the second network device obtains the fourth dwell time period based on the first instruction in 3062, and details are not described herein again. It should be noted that, the process in which the second network device obtains the fourth dwell time period needs to be applied to a delay that can be caused by the target packet flow. Therefore, if the second network device has not obtained the target packet flow when receiving the second instruction, the first network device may include the delay that can be caused by the target packet flow in the second instruction, so that the second network device normally determines the fourth dwell time period. After obtaining the fourth dwell time period, the second network device returns the fourth dwell time period to the first network device.

8033: The first network device receives the dwell time period of the target packet flow on the another network device sent by the another network device.

Because each network device that receives the second instruction performs a same operation as the second network device, the first network device can receive a dwell time period of the target packet flow on any network device in the other network devices. For example, the first network device correspondingly stores the dwell time period of the target packet flow on the another network device and a 5-tuple or a 3-tuple corresponding to the target packet flow, to read the dwell time period when required.

After obtaining the dwell time period of the target packet flow on the another network device, the first network device may further obtain the first packet through encapsulation. For example, the first network device may calculate a time difference between the second dwell time period and the first dwell time period, and then encapsulate the time difference, the dwell time period of the target packet flow on the another network device, and the second packet, to obtain the first packet. According to 801 to 803, the first network device can store dwell time periods of the target packet flow on all network devices on the core network transmission path. Therefore, any downstream network device of the first network device does not need to store a dwell time period of the target packet flow on the any network device, but reads the dwell time period of the target packet flow on the another network device.

804: The second network device receives the first packet sent by the first network device.

Compared with 304 in which the first packet includes only the first dwell time period, the second dwell time period, and the second packet, or includes only the time difference between the second dwell time period and the first dwell time period and the second packet, the first packet received by the second network device in 804 further includes one or more upstream dwell time periods of the target packet flow on the one or more upstream network devices. The one or more upstream dwell time periods are in a one-to-one correspondence with the one or more upstream network devices, and any upstream dwell time period is an upper threshold for a period of dwelling of the target packet flow on an upstream network device. In addition, one or more downstream dwell time periods of the target packet flow on the one or more downstream network devices are included, the one or more downstream dwell time periods are in a one-to-one correspondence with the one or more downstream network devices, and any downstream dwell time period is an upper threshold for a period of dwelling of the target packet flow on a downstream network device.

805: The second network device obtains the second packet in the target packet flow, the first dwell time period of the second packet on the first network device, the second dwell time period of the target packet flow on the first network device, and the dwell time period of the target packet flow on the another network device based on the first packet.

The second network device may obtain the second packet in the target packet flow, the first dwell time period of the second packet on the first network device, the second dwell time period of the target packet flow on the first network device, and the dwell time period of the target packet flow on the another network device by parsing the first packet.

806: The second network device determines the time difference between the second dwell time period of the target packet flow on the first network device and the first dwell time period of the second packet on the first network device, where the time difference is an active delay time period of the second packet on the second network device.

For a process in which the second network device determines the time difference, refer to the description in 305. Details are not described herein again.

807: The second network device obtains a third dwell time period of the second packet on the second network device, and obtains a fourth dwell time period of the target packet flow on the second network device.

For a process in which the second network device obtains the third dwell time period, refer to the description in 306. The second network device may read the fourth dwell time period of the target packet flow on the second network device from the dwell time period of the target packet flow on the another network device in the first packet. It should be noted that, after the fourth dwell time period of the target packet flow on the second network device is obtained in operation 807, the upper threshold for a period of dwelling of the first another packet flow on the second network device does not need to be updated according to the description in operation 306. A reason is that a dwell time period of the first another packet flow on the second network device is also stored in the first network device, and the second network device does not need to store the dwell time period of the first another packet flow on the second network device. Therefore, even if the upper threshold for a period of dwelling of the first another packet flow on the second network device needs to be updated, the update process is also performed by the first network device. After performing the update process, the first network device stores an updated upper threshold in each packet included in the first another packet flow, and the second network device may obtain the updated upper threshold by reading the packet.

808: The second network device encapsulates the second packet, the third dwell time period of the second packet on the second network device, and the downstream dwell time period of the target packet flow on the one or more downstream network devices of the first network device, to obtain a third packet.

For a process in which the second network device obtains the third packet through encapsulation and sends the third packet, refer to descriptions in 307. It should be noted that, in a process in which a next-hop network device forwards the second packet, a dwell time period that needs to be encapsulated together with the second packet also includes the downstream dwell time period of the target packet flow on the one or more downstream network devices of the first network device. For example, in an encapsulation process of the next-hop network device, the fourth dwell time period of the target packet flow on the second network device may be first deleted from the downstream dwell time period of the target packet flow on the one or more downstream network devices of the first network device, to obtain a downstream dwell time period of the target packet flow on one or more downstream network devices of the second network device. Then, the downstream dwell time period of the target packet flow on the one or more downstream network devices of the second network device, the second packet, and another required dwell time period are encapsulated.

809: The second network device sends the third packet to the next-hop network device of the second network device on the core network transmission path of the target packet flow after the first packet received by the second network device reaches the active delay time period and is queued in a queuing system of the second network device.

For a process in which the second network device sends the third packet, refer to the description in 308. Details are not described herein again.

In an embodiment, regardless of whether the first network device and the second network device interact with each other according to 301 to 308 or 801 to 809, after the first network device sends the first packet to the second network device, the method further includes the following processes A1 to A3.

A1: The first network device stops obtaining the target packet flow, and sends a third instruction to the another network device, where the third instruction is used for notifying the another network device of first information, and the first information is that the first network device stops obtaining the target packet flow.

If the first network device stops obtaining the target packet flow, in other words, the target packet flow has left the core network, a dwell time period corresponding to a transmission port that is for transmitting the target packet flow and that is on each network device on the core network transmission path of the target packet flow needs to be updated according to a network calculus theory. It may be understood that, in addition to sending the third instruction, the first network device also needs to update a ninth dwell time period corresponding to a local second port that is of the first network device and that is for transmitting the target packet flow.

A2: The second network device receives the third instruction sent by the first network device, where the third instruction is used for notifying the second network device of the first information, and the first information is that the first network device stops obtaining the target packet flow.

Because the first network device sends the third instruction, any network device on the core network transmission path of the target packet flow can receive the third instruction. In A3, the second network device is used as an example to describe an update process of a dwell time period corresponding to a transmission port that is on any network device and that is for transmitting the target packet flow.

A3: The second network device updates a sixth dwell time period based on the third instruction to obtain a seventh dwell time period.

A transmission port that is on the second network device and that is for transmitting the target packet flow is a first port. In a process of transmitting the target packet flow, a dwell time period corresponding to the first port is the sixth dwell time period. For example, the updating a sixth dwell time period to obtain a seventh dwell time period includes: using a difference between the sixth dwell time period and the delay that can be caused by the target packet flow as the seventh dwell time period. After obtaining the seventh dwell time period, the second network device further stores the seventh dwell time period, so that after obtaining a new packet flow, the first network device can calculate a fourth dwell time period of the new packet flow on the second network device based on the stored seventh dwell time period.

Figure 9:
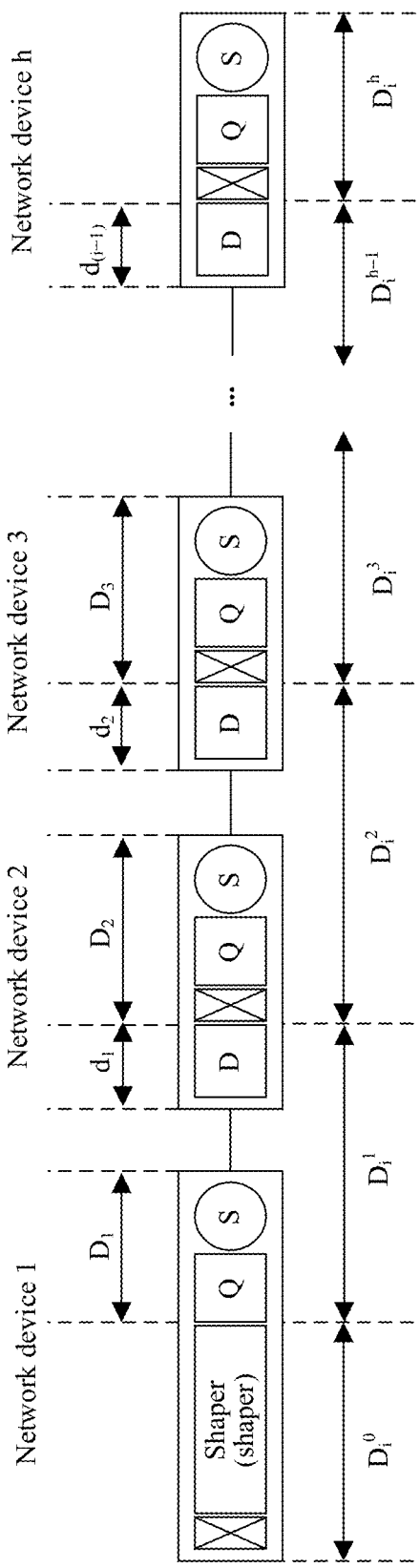
FIG. 9 is a schematic diagram of a network architecture according to an embodiment of this application.

FIG. 9 shows a core network architecture for packet transmission. For ease of description, network devices shown in FIG. 9 are numbered 1, 2, ..., and h, and the packet transmission methods provided in 301 to 308 and 801 to 809 are separately described.

According to the packet transmission method provided in 301 to 308, any network device stores only an upper threshold for a period of dwelling of a packet flow in which a packet is located on the any network device. For example, a network device 1 stores only an upper threshold for a period of dwelling of the packet flow on the network device 1. In this case, a packet transmission process includes the following B1 to B10.

B1: Network devices 1 to (h−1) each store a dwell time period corresponding to each local transmission port.

B2: After receiving a packet 1 from a terminal node configured to send the packet 1, the network device 1 rectifies the packet 1, so that a data amount of the packet meets a requirement of the formula (1).

B3: The network device 1 sends resource reservation signaling to network devices 2 to h.

B4: For any one of the network devices 2 to h, after successfully reserving a bandwidth for the packet 1 based on the resource reservation signaling, the any network device determines a dwell time period of the packet 1 on the any network device based on a locally stored dwell time period corresponding to each transmission port, and stores the dwell time period.

B5: The network device 1 locally reads an upper threshold $D_i^1$ for a period of dwelling of the packet 1 in a current hop, obtains, by collecting statistics, a time period $D_1$ in which the packet 1 dwells in a queuing system and a scheduler of the current hop, encapsulates $D_1$, $D_i^1$, and the packet 1 to obtain a packet 2, and sends the packet 2 to the network device 2.

B6: The network device 2 receives the packet 2, calculates an active delay time period $d_1$ of the packet 1 on a current hop based on $D_1$ and $D_i^1$ in the packet 2, where $d_1=D_i^1-D_1$; and releases the packet 1 from a damper after the active delay time period $d_1$.

B7: The network device 2 reads a locally stored upper threshold $D_i^2$ for a period of dwelling of the packet 1 in a current hop, obtains, by collecting statistics, a time period $D_2$ in which the packet 1 dwells in a queuing system and a scheduler of the current hop, encapsulates $D_2$, $D_i^2$, and the packet 1 to obtain a packet 3, and sends the packet 3 to the network device 3.

B8: Any network device H (3≤H≤(h−1)) in network devices 3 to (h−1) receives a packet H sent by a previous-hop network device (H−1), where the packet H includes an upper threshold $D_i(H-1)$ for a period of dwelling of the packet 1 on the previous-hop network device, a time period $D_{(H-1)}$ in which the packet 1 dwells in a queuing system and a scheduler of the previous-hop network device, and the packet 1. The network device H calculates an active delay time period $d_{(H-1)}$ of the packet 1 in a current hop, where $d_{H-1}=D_i(H-1)-D_{(H-1)}$; and releases the packet 1 from a damper after the active delay time period $d_{(H-1)}$.

B9: The network device H reads a locally stored upper threshold $D_i^H$ for a period of dwelling of the packet 1 in a current hop, obtains, by collecting statistics, a time period $D_H$ in which the packet 1 dwells in a queuing system and a scheduler of the current hop, encapsulates $D_H$, $D_i^H$, and the packet 1 to obtain a packet (H+1), and sends the packet (H+1) to a network device (H+1).

B10: A network device h encapsulates the packet 1, and sends the encapsulated packet 1 to a terminal node configured to receive the packet 1.

According to the packet transmission method provided in 801 to 809, the network device 1 stores an upper threshold for a period of dwelling of a packet flow in which a packet is located on all network devices in the network devices 2 to h, and a packet transmission process includes the following C1 to C11.

C1: Network devices 1 to (h−1) each store a dwell time period corresponding to each local transmission port.

C2: After receiving a packet 1 from a terminal node configured to send the packet 1, the network device 1 rectifies the packet 1, so that a data amount of the packet 1 meets a requirement of the formula (1).

C3: The network device 1 sends resource reservation signaling to the network devices 2 to h.

C4: For any one of the network devices 2 to h, after successfully reserving a bandwidth for the packet based on the resource reservation signaling, the any network device determines an upper threshold for a period of dwelling of the packet 1 on the any network device based on a locally stored dwell time period corresponding to each transmission port, and returns the upper threshold to the network device 1.

C5: The network device 1 receives an upper threshold $D_i^2$ for a period of dwelling of the packet 1 returned by the network device 2 on the network device 2, . . . , and an upper threshold $D_i^h$ for a period of dwelling of the packet 1 returned by the network device h on the network device h, to obtain a dwell time period of the packet 1 on each network device on a core network transmission path, and stores the dwell time period as a list. The list includes $D_i^1$, $D_i^2$, $D_i^3$, . . . , $D_i^{h-1}$, and $D_i^h$.

C6: The network device 1 encapsulates the packet 1, a time period $D_1$ in which the packet 1 dwells in a queuing system and a scheduler of a current hop, and the list obtained in C5, to obtain a packet 2, and sends the packet 2 to the network device 2.

C7: The network device 2 receives the packet 2, reads $D_1$ from the packet 2, reads $D_i^1$ from the list of packet 2, calculates an active delay time period $d_1$ of the packet 1 on a current hop based on the read $D_1$ and $D_i^1$, where $d_1=D_i^1-D_1$; and releases the packet 1 from a damper after the active delay time period $d_1$.

C8: The network device 2 obtains, by collecting statistics, a time period $D_2$ in which the packet 1 dwells in a queuing system and a scheduler of the current hop, deletes $D_i^1$ from the list, encapsulates the packet 1, $D_2$, and a list with $D_i^1$ deleted into a packet 3, and sends the packet 3 to the network device 3.

C9: Any network device H (3≤H≤(h−1)) in network devices 3 to (h−1) receives a packet H sent by a previous-hop network device (H−1), reads from the packet H, reads $D_i^{(H-1)}$ from a list of the packet H, calculates an active delay time period $d_{(H-1)}$ of the packet 1 on a current hop based on the read $D_{(H-1)}$ and $D_i^{(H-1)}$, and releases the packet 1 from a damper after the active delay time period $d_{(H-1)}$.

C10: The network device H obtains, by collecting statistics, a time period $D_H$ in which the packet 1 dwells in a queuing system and a scheduler of a current hop, deletes $D_i^{(H-1)}$ from the list, encapsulates the packet 1, $D_2$, and a list with $D_i^{(H-1)}$ deleted into a packet (H+1), and sends the packet (H+1) to the network device (H+1).

C11: A network device h encapsulates the packet 1, and sends the encapsulated packet 1 to a terminal node configured to receive the packet 1.

In conclusion, in this application, each network device actively delays a to-be-transmitted second packet, to ensure that to-be-transmitted packet has a deterministic delay between a pair of adjacent network devices, and further ensure that the to-be-transmitted second packet has a deterministic delay between two ends. In addition, a time period in which each network device performs active delay is obtained based on a target packet flow in which the second packet is located. This avoids mutual interference between different packet flows. Therefore, the method provided in embodiments of this application is not only simple to implement, but also applicable to IP networks of various scales. It can be learned that the method is practical and has good transmission effect.

Figure 10:
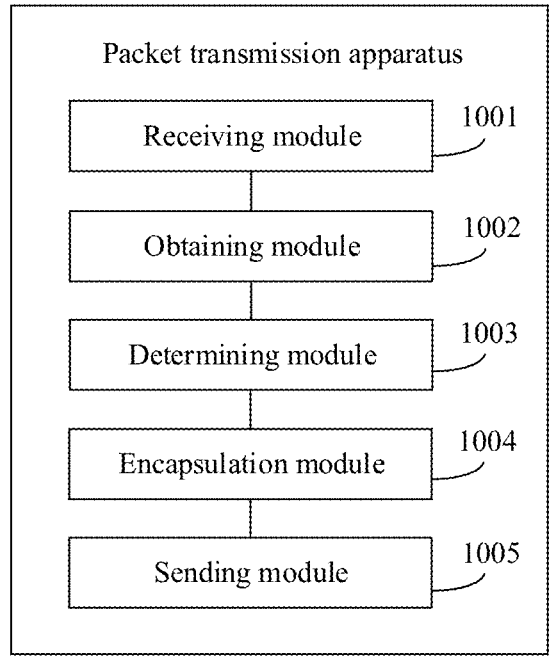
FIG. 10 is a schematic diagram of a structure of a packet transmission apparatus according to an embodiment of this application.

As shown in FIG. 10, an embodiment of this application further provides a packet transmission apparatus. The apparatus is applied to a second network device, to perform the packet transmission methods shown in FIG. 3A, FIG. 3B, FIG. 8A, and FIG. 8B. The apparatus includes:

a receiving module 1001, configured to receive, by a second network device, a first packet sent by a first network device;

an obtaining module 1002, configured to obtain, by the second network device, a second packet in a target packet flow, a first dwell time period of the second packet on the first network device, and a second dwell time period of the target packet flow on the first network device based on the first packet, where the first dwell time period is a time difference between a first moment and a second moment, the first moment is a moment at which the second packet enters a queuing system of the first network device, the second moment is a moment at which the second packet is sent by the first network device after being queued in the queuing system of the first network device, and the second dwell time period is an upper threshold for a period of dwelling of the target packet flow on the first network device;

a determining module 1003, configured to determine, by the second network device, a time difference between the second dwell time period of the target packet flow on the first network device and the first dwell time period of the second packet on the first network device, where the time difference is an active delay time period of the second packet on the second network device;

the obtaining module 1002 is further configured to: obtain a third dwell time period of the second packet on the second network device, and obtain a fourth dwell time period of the target packet flow on the second network device, where the third dwell time period is a time difference between a third moment and a fourth moment, the third moment is a moment at which the second network device ends an active delay of the second packet, the fourth moment is a moment at which the second packet is sent by the second network device after being queued in a queuing system of the second network device, and the fourth dwell time period is an upper threshold for a period of dwelling of the target packet flow on the second network device;

an encapsulation module 1004, configured to encapsulate the third dwell time period of the second packet on the second network device, the fourth dwell time period of the target packet flow on the second network device, and the second packet, to obtain a third packet; and a sending module 1005, configured to send the third packet to a next-hop network device of the second network device on a core network transmission path of the target packet flow after the first packet received by the second network device reaches the active delay time period and is queued in the queuing system of the second network device.

In an embodiment, the core network transmission path of the target packet flow includes one or more upstream network devices of the first network device and one or more downstream network devices of the first network device. The first packet further includes one or more upstream dwell time periods of the target packet flow on the one or more upstream network devices, the one or more upstream dwell time periods are in a one-to-one correspondence with the one or more upstream network devices, and any upstream dwell time period is an upper threshold for a period of dwelling of the target packet flow on an upstream network device. The first packet further includes one or more downstream dwell time periods of the target packet flow on the one or more downstream network devices, the one or more downstream dwell time periods are in a one-to-one correspondence with the one or more downstream network devices, and any downstream dwell time period is an upper threshold for a period of dwelling of the target packet flow on a downstream network device.

The encapsulation module 1004 is configured to encapsulate the second packet, the third dwell time period of the second packet on the second network device, and the downstream dwell time periods of the target packet flow on the one or more downstream network devices of the first network device, to obtain the third packet.

In an embodiment, the receiving module 1001 is further configured to receive a first instruction sent by the first network device.

The obtaining module 1002 is further configured to: determine, based on the first instruction, a first port for transmitting the target packet flow on the second network device; obtain a fifth dwell time period corresponding to the first port, where the fifth dwell time period is a time determined based on a first another packet flow, and the first another packet flow is a packet flow transmitted through the first port before the second network device obtains the target packet flow; update the fifth dwell time period based on the target packet flow to obtain a sixth dwell time period; and use the sixth dwell time period as the fourth dwell time period of the target packet flow on the second network device.

In an embodiment, the receiving module 1001 is further configured to receive a third instruction sent by the first network device, where the third instruction is used for notifying the second network device of first information, and the first information is that the first network device stops obtaining the target packet flow.

The obtaining module 1002 is further configured to update the sixth dwell time period based on the third instruction to obtain the seventh dwell time period.

In an embodiment, the receiving module 1001 is further configured to receive a third instruction sent by the first network device, where the third instruction is used for notifying the second network device of first information, and the first information is that the first network device stops obtaining the target packet flow.

The obtaining module 1002 is further configured to update the sixth dwell time period based on the third instruction to obtain the seventh dwell time period.

Figure 11:
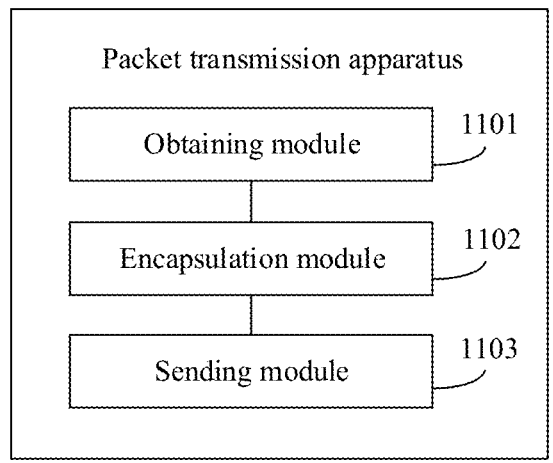
FIG. 11 is a schematic diagram of a structure of a packet transmission apparatus according to an embodiment of this application.

Refer to FIG. 11. An embodiment of this application further provides a packet transmission apparatus. The apparatus is applied to a first network device, to perform the packet transmission methods shown in FIG. 3A, FIG. 3B, FIG. 8A, and FIG. 8B. The apparatus includes:

an obtaining module 1101, configured to: obtain, by a first network device, a second packet in a to-be-transmitted target packet flow, and obtain a first dwell time period of the second packet on the first network device, where the first dwell time period is a time difference between a first moment and a second moment, the first moment is a moment at which the second packet enters a queuing system of the first network device, and the second moment is a moment at which the second packet is sent by the first network device after being queued in the queuing system of the first network device; and obtain a second dwell time period of the target packet flow on the first network device, where the second dwell time period is an upper threshold for a period of dwelling of the target packet flow on the first network device;

an encapsulation module 1102, configured to encapsulate the second packet, the first dwell time period of the second packet on the first network device, and the second dwell time period of the target packet flow on the first network device, to obtain a first packet; and a sending module 1103, configured to send the first packet to a second network device.

In an embodiment, a core network transmission path of the target packet flow includes another network device other than the first network device, and the encapsulation module 1102 is configured to encapsulate the second packet, the first dwell time period of the second packet on the first network device, the second dwell time period of the target packet flow on the first network device, and a dwell time period of the target packet flow on the another network device, to obtain the first packet, where the dwell time period of the target packet flow on the another network device is an upper threshold for a period of dwelling of the target packet flow on the another network device.

In an embodiment, the apparatus further includes: a determining module, where the determining module is configured to: determine a second port for transmitting the target packet flow on the first network device; obtain an eighth dwell time period corresponding to the second port, where the eighth dwell time period is a time determined based on a second another packet flow, and the second another packet flow is a packet flow transmitted through the second port before the first network device obtains the target packet flow; determine the second dwell time period of the target packet flow on the first network device based on the eighth dwell time period; and store the second dwell time period of the target packet flow on the first network device.

In an embodiment, the sending module 1103 is further configured to send a first instruction to the another network device, where the first instruction is used by any network device of the another network device to obtain and store a dwell time period of the target packet flow on the any network device.

In an embodiment, the sending module 1103 is further configured to send a second instruction to the another network device;

The apparatus further includes: a receiving module, configured to receive the dwell time period of the target packet flow on the another network device sent by the another network device, where the dwell time period of the target packet flow on the another network device is sent by the another network device based on the second instruction.

In an embodiment, the sending module 1103 is further configured to: stop obtaining the target packet flow, and sending a third instruction to the another network device, where the third instruction is used for notifying the another network device of first information, and the first information is that the first network device stops obtaining the target packet flow.

In conclusion, in this application, each network device actively delays a to-be-transmitted packet, to ensure that to-be-transmitted packet has a deterministic delay between a pair of adjacent network devices, and further ensure that the to-be-transmitted packet has a deterministic delay between two ends. In addition, a time period in which each network device performs actively delay is obtained based on a packet flow in which the to-be-transmitted packet is located. This avoids mutual interference between different packet flows. Therefore, the method provided in embodiments of this application is not only simple to implement, but also applicable to IP networks of various scales. It can be learned that the method is practical and has good transmission effect.

It should be understood that, when the apparatuses shown in FIG. 10 or FIG. 11 implement functions of the apparatuses, division into the foregoing functional modules is merely used as an example for description. In actual application, the foregoing functions may be allocated to different functional modules for implementation based on a requirement. In other words, an inner structure of a device is divided into different functional modules, to implement all or some of the functions described above. In addition, the apparatuses provided in the foregoing embodiments and the method embodiments pertain to a same concept. For a specific implementation process of the apparatuses, refer to the method embodiments. Details are not described herein again.

An embodiment of this application provides a network device. The network device includes a memory and a processor. The memory stores at least one instruction, and the at least one instruction is loaded and executed by the processor, to implement the method that needs to be performed by the first network device in this application.

An embodiment of this application provides a network device. The network device includes a memory and a processor. The memory stores at least one instruction, and the at least one instruction is loaded and executed by the processor, to implement the method that needs to be performed by the second network device in this application.

Figure 12:
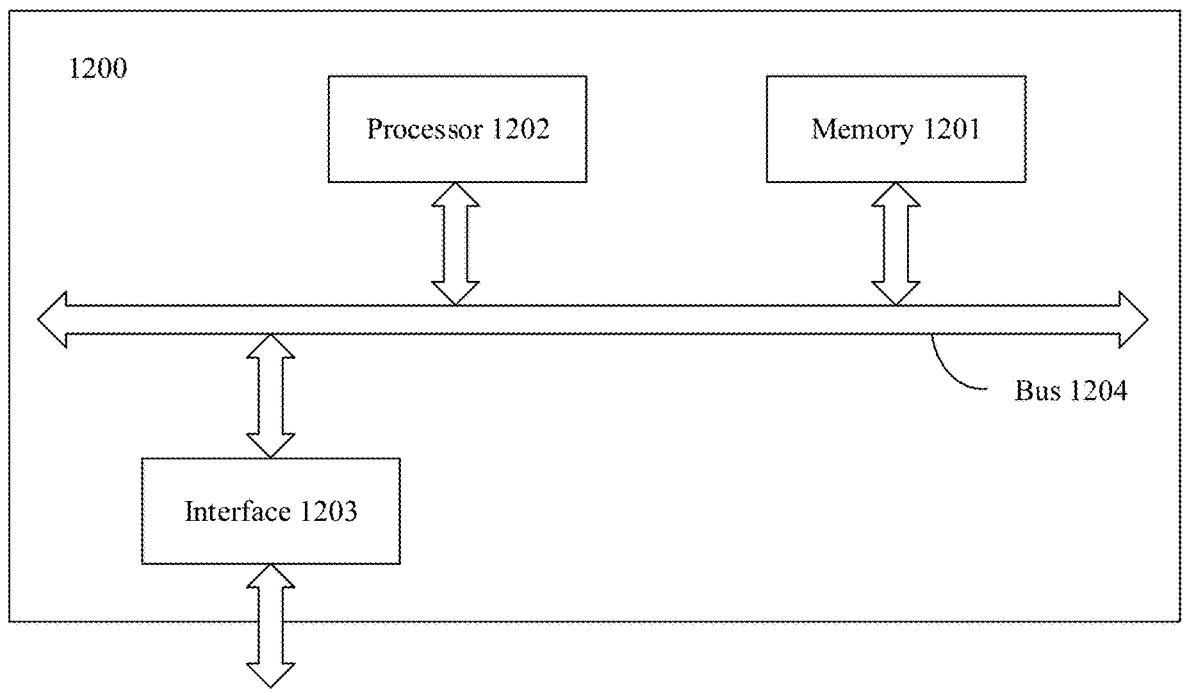
FIG. 12 is a schematic diagram of a structure of a packet transmission device according to an embodiment of this application.

Refer to FIG. 12. An embodiment of this application further provides a packet transmission device 1200. The packet transmission device 1200 shown in FIG. 12 is configured to perform operations related to the packet transmission method. The packet transmission device 1200 includes a memory 1201, a processor 1202, and an interface 1203. The memory 1201, the processor 1202, and the interface 1203 are connected through a bus 1204.

The memory 1201 stores at least one instruction, and the at least one instruction is loaded and executed by the processor 1202, to implement any one of the foregoing packet transmission methods.

The interface 1203 is configured to communicate with another device in a network. The interface 1203 may implement communication in a wireless or wired manner. For example, the interface 1203 may be a network adapter. For example, the packet transmission device 1200 may communicate with a server through the interface 1203.

It should be understood that FIG. 12 shows only a simplified design of the packet transmission device 1200. During actual application, the packet transmission device may include any quantity of interfaces, processors, or memories. In addition, the processor may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, any conventional processor, or the like. It should be noted that the processor may be a processor that supports an advanced Reduced instruction set machines (ARM) architecture.

Further, in an optional embodiment, the memory may include a read-only memory and a random access memory, and provide instructions and data for the processor. The memory may further include a non-volatile random access memory. For example, the memory may further store information of a device type.

An embodiment of this application provides a communication apparatus. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method that needs to be performed by the first network device in this application.

An embodiment of this application provides a communication apparatus. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method that needs to be performed by the first network device in this application.

Optionally, there are one or more processors, and there are one or more memories.

Optionally, the memory and the processor may be integrated together, or the memory and the processor may be separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

A packet transmission system is provided. The system includes a first network device and a second network device, and the first network device and the second network device are communicatively connected. For the packet transmission method of the first network device and the second device, refer to related descriptions in embodiments shown in FIG. 2 to FIG. 4. Details are not described herein again.

An embodiment of this application provides a computer program (product). The computer program (product) includes computer program code. When the computer program code is run by a computer, the computer is enabled to perform the method provided in any one of the foregoing embodiments of this application.

An embodiment of this application provides a readable storage medium. The readable storage medium stores programs or instructions. When the programs or the instructions are run on a computer, the method provided in any one of the embodiments of this application is performed.

An embodiment of this application provides a chip, including a processor, configured to invoke and run instructions stored in a memory, so that a communication device in which the chip is installed performs the method provided in any one of the embodiments of this application.

An embodiment of this application provides a chip, including an input interface, an output interface, a processor, and a memory. The input interface, the output interface, the processor, and the memory are connected through an internal connection channel. The processor is configured to execute code in the memory. When the code is executed, the processor is configured to perform the method provided in any one of the embodiments of this application.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, any conventional processor, or the like. It should be noted that the processor may be a processor that supports an advanced reduced instruction set computing machines (ARM) architecture.

Further, in an optional embodiment, the memory may include a read-only memory and a random access memory, and provide instructions and data for the processor. The memory may further include a non-volatile random access memory. For example, the memory may further store information of a device type.

The memory may be a volatile memory or a nonvolatile memory, or may include the volatile memory and the nonvolatile memory. The nonvolatile memory may be a read-only memory ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation description, RAMs in many forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

This application provides a computer program. When the computer program is executed by a computer, a processor or the computer is enabled to perform corresponding operations and/or procedures in the foregoing method embodiments.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, all or a part of the procedures or functions are generated according to this application. The computer may be a general-purpose computer, a dedicated computer, a computer network, or other programmable apparatuses. The computer instruction may be stored in a computer-readable storage medium, or may be transmitted from a computer-readable storage medium to another computer-readable storage medium. For example, the computer instruction may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive (SSD)), or the like.

What is claimed is:

1. A packet transmission method, comprising:
receiving, by a second network device, a first packet sent by a first network device;
obtaining, by the second network device, a second packet in a target packet flow, a first dwell time period of the second packet on the first network device, and a second dwell time period of the target packet flow on the first network device based on the first packet, wherein the first dwell time period is a time difference between a first moment at which the second packet enters a queuing system of the first network device and a second moment at which the second packet is sent by the first network device after being queued in the queuing system of the first network device;
determining, by the second network device, a time difference between the second dwell time period and the first dwell time period, wherein the time difference is an active delay time period of the second packet on the second network device;

obtaining a third dwell time period of the second packet on the second network device, and obtaining a fourth dwell time period of the target packet flow on the second network device, wherein the third dwell time period is a time difference between a third moment at which the second network device ends an active delay of the second packet and a fourth moment at which the second packet is sent by the second network device after being queued in a queuing system of the second network device;

encapsulating the third dwell time period, the fourth dwell time period, and the second packet, to obtain a third packet; and sending, by the second network device, the third packet to a next-hop network device of the second network device on a core network transmission path of the target packet flow after the first packet received by the second network device reaches the active delay time period and is queued in the queuing system of the second network device.

2. The method according to claim 1, wherein the core network transmission path of the target packet flow comprises one or more upstream network devices and downstream network device of the first network device, wherein the first packet further comprises:

one or more upstream dwell time periods of the target packet flow on the one or more upstream network devices, wherein the one or more upstream dwell time periods are in a one-to-one correspondence with the one or more upstream network devices, any upstream dwell time period is an upper threshold for a period of dwelling of the target packet flow on an upstream network device, and one or more downstream dwell time periods of the target packet flow on the one or more downstream network devices, wherein the one or more downstream dwell time periods are in a one-to-one correspondence with the one or more downstream network devices, and any downstream dwell time period is an upper threshold for a period of dwelling of the target packet flow on a downstream network device.

3. The method of claim 2, wherein encapsulating the third dwell time period, the fourth dwell time period, and the second packet comprises:

encapsulating the second packet, the third dwell time period, and the downstream dwell time periods, to obtain the third packet.

4. The method according to claim 1, wherein before receiving the first packet sent by the first network device, the method further comprises:

receiving a first instruction sent by the first network device;

determining a first port for transmitting the target packet flow on the second network device based on the first instruction; and obtaining a fifth dwell time period corresponding to the first port, wherein the fifth dwell time period is a time determined based on another packet flow transmitted through the first port before the second network device obtains the target packet flow.

5. The method of claim 4, further comprising:

updating the fifth dwell time period based on the target packet flow to obtain a sixth dwell time period; and using the sixth dwell time period as the fourth dwell time period of the target packet flow on the second network device.

6. The method according to claim 1, wherein before receiving the first packet sent by the first network device, the method further comprises:

receiving a second instruction sent by the first network device;

obtaining the fourth dwell time period of the target packet flow on the second network device based on the second instruction; and sending the fourth dwell time period to the first network device.

7. The method according to claim 5, further comprising:

receiving a third instruction sent by the first network device, wherein the third instruction is used for notifying the second network device that the first network device stops obtaining the target packet flow; and updating the sixth dwell time period based on the third instruction to obtain a seventh dwell time period.

8. A packet transmission method, comprising:

obtaining, by a first network device, a second packet in a target packet flow, and obtaining a first dwell time period of the second packet on the first network device, wherein the first dwell time period is a time difference between a first moment at which the second packet enters a queuing system of the first network device and a second moment at which the second packet is sent by the first network device after being queued in the queuing system of the first network device;

obtaining a second dwell time period of the target packet flow on the first network device, wherein the second dwell time period is an upper threshold for a period of dwelling of the target packet flow on the first network device;

encapsulating the second packet, the first dwell time period, and the second dwell time period, to obtain a first packet; and sending the first packet to a second network device.

9. The method according to claim 8, wherein a core network transmission path of the target packet flow comprises a third network device other than the first network device, and wherein encapsulating the second packet, the first dwell time period, and the second dwell time period comprises:

encapsulating the second packet, the first dwell time period, the second dwell time period, and a third dwell time period of the target packet flow on the third network device, to obtain the first packet, wherein the third dwell time period is an upper threshold for a period of dwelling of the target packet flow on the third network device.

10. The method according to claim 8, wherein before obtaining the second packet in the target packet flow, the method further comprises:

determining a second port for transmitting the target packet flow on the first network device;

obtaining an eighth dwell time period corresponding to the second port, wherein the eighth dwell time period is a time determined based on another packet flow transmitted through the second port before the first network device obtains the target packet flow;

determining the second dwell time period of the target packet flow on the first network device based on the eighth dwell time period; and storing the second dwell time period of the target packet flow on the first network device.

11. The method according to claim 9, wherein before obtaining the second packet in the target packet flow, the method further comprises:
sending a first instruction to the third network device, wherein the first instruction is used by any network device of the third network device to obtain and store a dwell time period of the target packet flow on the any network device.

12. The method according to claim 9, wherein before obtaining the second packet in the target packet flow, the method further comprises:
sending a second instruction to the third network device; and
receiving a dwell time period of the target packet flow on the third network device sent by the third network device based on the second instruction.

13. The method according to claim 9, further comprising:
stopping obtaining the target packet flow; and
sending a third instruction to the third network device, wherein the third instruction is used for notifying the third network device that the first network device stops obtaining the target packet flow.

14. A packet transmission apparatus, comprising:
one or more processors; and
a non-transitory computer-readable memory storing instructions that, when executed by the one or more processors, cause the apparatus to perform operations, the operations comprising:
receiving a first packet sent by a first network device;
obtaining a second packet in a target packet flow, a first dwell time period of the second packet on the first network device, and a second dwell time period of the target packet flow on the first network device based on the first packet, wherein the first dwell time period is a time difference between a first moment at which the second packet enters a queuing system of the first network device and a second moment at which the second packet is sent by the first network device after being queued in the queuing system of the first network device;
determining a time difference between the second dwell time period and the first dwell time period, wherein the time difference is an active delay time period of the second packet;
obtaining a third dwell time period of the second packet and a fourth dwell time period of the target packet flow, wherein the third dwell time period is a time difference between a third moment at which the second network device ends an active delay of the second packet and a fourth moment at which the second packet is sent after being queued in a queuing system;
encapsulating the third dwell time period and the second packet to obtain a third packet; and
send the third packet to a next-hop network device on a core network transmission path of the target packet flow after the first packet received reaches the active delay time period and is queued in the queuing system.

15. The apparatus according to claim 14, wherein the core network transmission path of the target packet flow comprises one or more upstream network devices and downstream network devices of the first network device, and
wherein the first packet further comprises:
one or more upstream dwell time periods of the target packet flow on the one or more upstream network devices, wherein the one or more upstream dwell time periods are in a one-to-one correspondence with the one or more upstream network devices, any upstream dwell time period is an upper threshold for a period of dwelling of the target packet flow on an upstream network device, and
one or more downstream dwell time periods of the target packet flow on the one or more downstream network devices, wherein the one or more downstream dwell time periods are in a one-to-one correspondence with the one or more downstream network devices, and any downstream dwell time period is an upper threshold for a period of dwelling of the target packet flow on a downstream network device.

16. The apparatus of claim 15, wherein the operations further comprise:
encapsulating the second packet, the third dwell time period, and the downstream dwell time periods, to obtain the third packet.

17. The apparatus according to claim 14, wherein the operations further comprise:
receiving a first instruction sent by the first network device;
determining, based on the first instruction, a first port for transmitting the target packet flow; and
obtaining a fifth dwell time period corresponding to the first port, wherein the fifth dwell time period is a time determined based on another packet flow transmitted through the first port.

18. The apparatus according to claim 17, wherein the operations further comprise:
updating the fifth dwell time period based on the target packet flow to obtain a sixth dwell time period; and
using the sixth dwell time period as the fourth dwell time period of the target packet flow.

19. The apparatus according to claim 18, wherein the operations further comprise:
receiving a third instruction sent by the first network device, wherein the third instruction is used for notifying the first network device to stop obtaining the target packet flow; and
updating the sixth dwell time period based on the third instruction to obtain a seventh dwell time period.

20. The apparatus according to claim 19, wherein the operations further comprise:
receiving the third instruction sent by the first network device, wherein the third instruction is used for notifying the first network device to stop obtaining the target packet flow; and
updating the sixth dwell time period based on the third instruction to obtain the seventh dwell time period.

* * * * *